United States Patent
Yamakawa et al.

(10) Patent No.: US 7,218,299 B2
(45) Date of Patent: May 15, 2007

(54) LIQUID CRYSTAL DISPLAY APPARATUS

(75) Inventors: Eiji Yamakawa, Sanda (JP); Naoki Masazumi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 396 days.

(21) Appl. No.: 10/366,762

(22) Filed: Feb. 14, 2003

(65) Prior Publication Data
US 2003/0156089 A1   Aug. 21, 2003

(30) Foreign Application Priority Data
Feb. 18, 2002   (JP)   .............................. 2002-087192

(51) Int. Cl.
G09G 3/36   (2006.01)
(52) U.S. Cl. ............................ 345/87; 345/94; 345/97; 345/208
(58) Field of Classification Search ................. 345/87, 345/94, 97, 208
See application file for complete search history.

(56) References Cited

U.S. PATENT DOCUMENTS

| | | | |
|---|---|---|---|
| 5,748,277 A | 5/1998 | Huang et al. | 349/169 |
| 6,154,190 A * | 11/2000 | Yang et al. | 345/94 |
| 6,268,840 B1 | 7/2001 | Huang | |
| 6,278,429 B1 | 8/2001 | Ruth et al. | |
| 6,501,454 B1 * | 12/2002 | Ozawa et al. | 345/96 |
| 6,784,968 B1 * | 8/2004 | Hughes et al. | 349/179 |
| 6,822,631 B1 * | 11/2004 | Yatabe | 345/89 |
| 7,034,816 B2 * | 4/2006 | Yatabe | 345/213 |
| 2002/0015015 A1 * | 2/2002 | Leung et al. | 345/87 |

FOREIGN PATENT DOCUMENTS

| | | |
|---|---|---|
| EP | 1 152 390 A2 | 11/2001 |
| JP | 10-206899 A | 8/1998 |
| JP | 10-232382 A | 9/1998 |
| JP | 11-344961 A | 12/1999 |
| JP | 2001-166340 A | 6/2001 |
| JP | 2002-139722 A | 5/2002 |
| WO | WO 98/31002 A1 | 7/1998 |

(Continued)

OTHER PUBLICATIONS

Japanese Partial Translation of Notification of Reasons of Rejection, dated Aug. 1, 2006, for counterpart Japanese Patent Application No. 2002-087192.

Primary Examiner—Richard Hjerpe
Assistant Examiner—Leonid Shapiro
(74) Attorney, Agent, or Firm—Sidley Austin LLP

(57) ABSTRACT

This invention is directed to a liquid crystal display apparatus which includes a liquid crystal display element, and a driving device for driving the display element by simple matrix driving. The display element includes a liquid crystal layer exhibiting a cholesteric phase, and has scanning electrodes and signal electrodes. The driving device is configured such that a driving voltage of single polarity including a selection signal voltage is applied to the scanning electrodes in each frame, and the polarity of the driving voltage is reversed in every frame. The selection signal voltage is successively applied to each scanning electrode in a scanning period set for the scanning electrode, while a rewriting signal voltage corresponding to each scanning electrode in the selected state is applied to each signal electrode. An application period of the selection signal voltage to the scanning electrode is ½ the scanning period.

9 Claims, 15 Drawing Sheets

FOREIGN PATENT DOCUMENTS

| | | |
|---|---|---|
| WO | WO 98/50804 A2 | 11/1998 |
| WO | WO 98/55987 A2 | 12/1998 |
| WO | WO 99/59128 A1 | 11/1999 |
| WO | WO 00/74030 A1 | 12/2000 |
| WO | WO 01/08130 A1 | 2/2001 |
| WO | WO 01/31625 A1 | 5/2001 |
| WO | WO 01/82283 A1 | 11/2001 |

* cited by examiner

Ti:display period
Trs:reset period
Ts:selection period
Trt:maintaining period
Tsz:pre-selection period Tsz':post-selection period
Tss:scanning period
Tsp:selection pulse application period
+V1:reset pulse voltage
+V2:selection pulse voltage
+V3:maintaining pulse voltage -V1:reset pulse voltage
-V2:selection pulse voltage
-V3:maintaining pulse voltage Fig.13
(A)
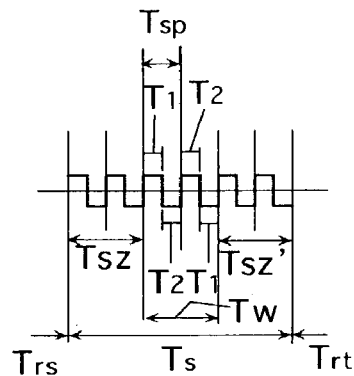
$T_1 + T_2 = T_{sp}$
(B)
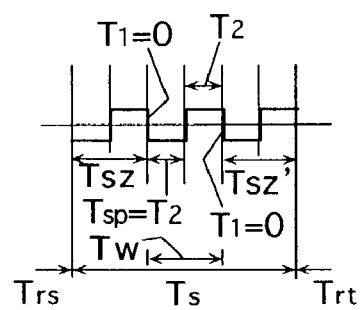
$T_1 + T_2 = T_{sp}$ ($T_1 = 0$)
(C)
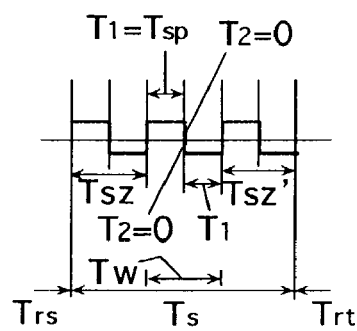
$T_1 + T_2 = T_{sp}$ ($T_2 = 0$)

LIQUID CRYSTAL DISPLAY APPARATUS

CROSS-REFERENCE TO RELATED APPLICATION

This application is based on Japanese patent application No. 2002-87192 filed in Japan on Feb. 18, 2002, the entire content of which is hereby incorporated by reference.

BACKGROUND OF THE INVENTION

1. Field of the Invention

The present invention relates to a method of driving a liquid crystal display element, a device for driving a liquid crystal display element and a liquid crystal display apparatus.

2. Description of Related Art

Usually the liquid crystal display apparatus includes a liquid crystal display element and a device for driving the liquid crystal display element.

The liquid crystal display element basically comprises a pair of substrates and a liquid crystal layer disposed between the substrates. By applying a predetermined driving voltage to the liquid crystal layer, the arrangement of liquid crystal molecules is controlled so that light incident on the liquid crystal element is modulated to perform a desired image display.

A wide variety of liquid crystal display elements have been proposed. In recent years, research has been conducted on a liquid crystal display element including a chiral nematic liquid crystal composition prepared by adding a chiral material to a nematic liquid crystal, the composition being caused to exhibit a cholesteric phase at room temperature due to the chiral material.

This type of liquid crystal display element is usable, for example, as a liquid crystal display element of reflection type utilizing a selective reflection capability of the chiral nematic liquid crystal composition.

In the reflection type liquid crystal display element, an image display can be performed by applying a high or low pulse voltage to switch the liquid crystal composition to a planar state (colored state) or to a focal conic state (transparent state).

Even after stopping the application of such pulse voltage, the liquid crystal composition can be kept in the planar state or the focal conic state, in other words, the liquid crystal composition can exhibit the so-called bi-stable property or can achieve a memory effect, whereby the image display can be kept after stopping the application of voltage.

The reflection type liquid crystal display element can perform a monochromatic (mono-color) image display utilizing a black or similar color background, a 2-color image display or a full color image display.

To realize, for example, an image display in full color, it is possible to use a laminate type liquid crystal display element including at least three liquid crystal layers, i.e. a red liquid crystal layer which can perform a red display, a green liquid crystal layer which can perform a green display, and a blue liquid crystal layer which can perform a blue display.

When at least one liquid crystal layer of this laminate type liquid crystal display element is maintained in a planar state (colored state), red, green, blue or other color can be displayed. When the laminate type liquid crystal display element is maintained in a focal conic state (transparent state), black color or like background color can be displayed.

In the liquid crystal display elements, usually electrodes are formed on the pair of substrates between which the liquid crystal layer is held, and are disposed so that the electrode-forming surfaces of the substrates are opposed to each other.

For example, a liquid crystal display element has an image display region composed of a plurality of pixels which are driven by a matrix driving system using a plurality of scanning electrodes and a plurality of signal electrodes which are opposed to each other.

In this liquid crystal display element, for example, a plurality of strips of scanning electrodes (or signal electrodes) extend in a predetermined direction with a specified gap in parallel with each other on one of the paired substrates, while a plurality of strips of signal electrodes (or scanning electrodes) extend in a predetermined direction with a specified gap in parallel with each other on the other substrate. The two groups of electrodes extend across each other when viewed from a plane. Each of the pixels corresponds to a portion of electrodes which intersect each other on the paired substrates.

Each electrode formed on the paired substrates is connected to a device for driving the liquid crystal display element. When a predetermined driving voltage is applied to the electrodes on the substrates from the driving device connected to the electrodes, the liquid crystal is driven to display a desired image.

The liquid crystal display element can be driven, for example, by a simple matrix driving method.

In the simple matrix driving method, the device for driving the liquid crystal display element includes, for example, a scanning driving IC connected to the plurality of scanning electrodes and capable of supplying a predetermined selection signal voltage to the scanning electrodes and a signal driving IC connected to the plurality of signal electrodes and capable of supplying a predetermined rewriting signal voltage to the signal electrodes.

The scanning electrodes are successively brought to a selected state by successively applying the predetermined selection signal voltage to each scanning electrode from the scanning driving IC connected to the plural scanning electrodes, while applying the predetermined rewriting signal voltage to each signal electrode in synchronization with application of the selection signal voltage to each scanning electrode from the signal driving IC connected to the plural signal electrodes to apply to the liquid crystal a voltage corresponding to a potential difference between the selection signal voltage and the rewriting signal voltage, whereby the liquid crystal is driven.

When the liquid crystal is driven by such simple matrix driving method, a voltage to be applied to the liquid crystal may be, for example, an alternating voltage which undergoes a periodical change in polarity of voltage waveform in each frame (for example, rectangular pulse voltage involving a periodical change in polarity of voltage waveform) from the viewpoint of increase in lifetime of the liquid crystal and others.

However, when an alternating voltage involving a periodical change in polarity of voltage waveform is applied to the liquid crystal which serves also as a condenser, a current more easily flows between the electrodes having the liquid crystal therebetween with an increase in the waveform repeating frequency of such alternating voltage, in which case the consumed power is increased for driving the liquid crystal display element.

Further, since a voltage corresponding to the alternating voltage is supplied to the scanning driving IC in one frame, the scanning driving IC is required to have a capability of withstanding a voltage corresponding to a difference between maximum and minimum voltages in the alternating electric field.

In the simple matrix driving method, a rewriting signal voltage is applied to the signal electrode corresponding to a pixel to be displayed in synchronization with the selection signal voltage in each scanning time in which the selection signal voltage is applied to the scanning electrode, and a voltage is applied based on the selection signal voltage and the rewriting signal voltage to the liquid crystal corresponding to the pixel to be displayed. In this operation, a voltage is applied to the liquid crystals corresponding to pixels not to be displayed by the rewriting signal voltage. Namely the so-called "cross-talk" occurs.

Due to the cross-talk in the the liquid crystal corresponding to those pixels, for example, one or more of the pixels to be displayed in high density are displayed in slightly low density, or one or more of the pixels to be displayed in low density are displayed in slightly high density. Namely an image like a shadow appears in the foregoing pixel portions. In other words, the phenomenon of shadowing occurs.

SUMMARY OF THE INVENTION

An object of the present invention is to provide a liquid crystal display apparatus which comprises a liquid crystal display element having a liquid crystal, and a driving device for driving the liquid crystal display element by matrix driving, the liquid crystal display apparatus being capable of reducing the consumption of power for driving the liquid crystal display element.

Another object of the present invention is to provide a liquid crystal display apparatus which comprises a liquid crystal display element having a liquid crystal, and a driving device for driving the liquid crystal display element by matrix driving, the liquid crystal display apparatus being capable of suppressing shadowing from occurring in image display when the liquid crystal suffers cross-talk due to a rewriting signal voltage applied to a signal electrode to display a better image.

A further object of the present invention is to provide a liquid crystal display apparatus which comprises a liquid crystal display element having a liquid crystal, and a driving device for driving the liquid crystal display element by matrix driving, the liquid crystal display apparatus being capable of employing a driving IC, which is low in voltage resistance, for driving the liquid crystal display element.

The present invention provides the following liquid crystal display apparatuses.

(1) First Liquid Crystal Display Apparatus

A liquid crystal display apparatus comprising:
a liquid crystal display element that includes a layer of a liquid crystal exhibiting a cholesteric phase, and a plurality of scanning electrodes and a plurality of signal electrodes extending across each other with the liquid crystal layer therebetween for performing display utilizing a selective reflection capability of the liquid crystal; and
a driving device for driving the liquid crystal display element by simple matrix driving,
wherein the driving device is configured such that (1) a driving voltage of single polarity including a selection signal voltage is applied to the scanning electrodes in each frame, and the polarity of the driving voltage is reversed in every frame; (2) the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode in synchronization with application of the selection signal voltage to the scanning electrode; and (3) an application period of the selection signal voltage to the scanning electrode is ½ the scanning period (half of the scanning period).

(2) Second Liquid Crystal Display Apparatus

A liquid crystal display apparatus comprising:
a liquid crystal display element that includes a layer of a liquid crystal exhibiting a cholesteric phase, and a plurality of scanning electrodes and a plurality of signal electrodes extending across each other with the liquid crystal layer therebetween; and
a driving device for driving the liquid crystal display element by simple matrix driving,
wherein the driving device is configured such that (1) a driving voltage of single polarity including a selection signal voltage, a reset voltage and a maintaining voltage is applied to the scanning electrodes in each frame, and the polarity of the driving voltage is reversed in every frame; (2) the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode in synchronization with application of the selection signal voltage to the scanning electrode; (3) reset voltage is applied to the scanning electrode to bring the liquid crystal to a homeotropic state before applying the selection signal voltage, and the maintaining voltage is applied to the scanning electrode to establish a state of the liquid crystal to be selected by the selection signal voltage after applying the selection signal voltage; and (4) the rewriting signal voltage to be applied to the signal electrode is changed in polarity within the scanning period, and effective values of positive voltage and negative voltage of the rewriting signal voltage are substantially equal to each other within the scanning period.

(3) Third Liquid Crystal Display Apparatus

A liquid crystal display apparatus comprises a liquid crystal display element, and a driving device for driving the liquid crystal display element by simple matrix driving, wherein the liquid crystal display element includes a liquid crystal layer, and has a plurality of scanning electrodes and a plurality of signal electrodes extending across each other with the liquid crystal layer therebetween, wherein the driving device is configured such that a driving voltage of single polarity including a selection signal voltage is applied to the scanning electrodes in each frame, and the polarity of the driving voltage is reversed in every frame; the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode in synchronization with application of the selection signal voltage to the scanning electrode; and the rewriting signal voltage to be applied to the signal electrode is changed in polarity within the scanning period, and effective values of positive voltage and negative voltage of the rewriting signal voltage are substantially equal to each other within the scanning period.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13(A) to FIG. 13(C) show an example of signal pulse wherein continuous time T1 or T2 of positive or negative voltage is not the same as the selection signal application period Tsp.

DESCRIPTION OF THE PREFERRED EMBODIMENTS

Figure 1:
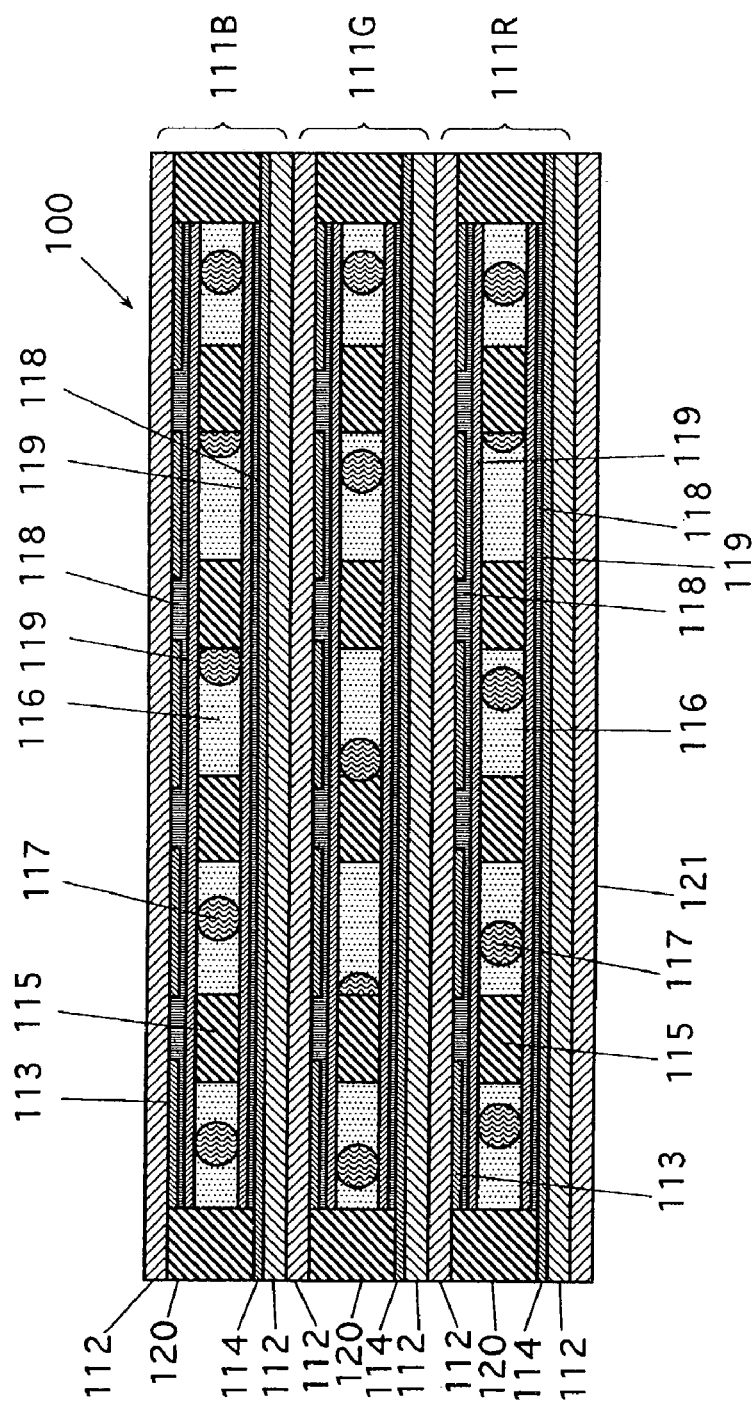
FIG. 1 is a sectional view schematically showing a structure of a reflective/laminate type full-color liquid crystal display element which can be driven by simple matrix driving method.

The liquid crystal display apparatus according to a preferred embodiment of the present invention basically comprises a liquid crystal display element, and a driving device for driving the liquid crystal display element. The liquid crystal display element may include a layer of a liquid crystal exhibiting a cholesteric phase (cholesteric characteristics), and may perform display utilizing a selective reflection of the liquid crystal. The element has a plurality of scanning electrodes and a plurality of signal electrodes, these electrodes extending across each other with the liquid crystal layer therebetween. The driving device can drive the liquid crystal element by simple matrix driving.

The driving device is configured such that a driving voltage of single polarity including a selection signal voltage is applied to the scanning electrodes in each frame, and the polarity of the driving voltage is reversed in every frame.

The driving device is also configured such that the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode in synchronization with application of the selection signal voltage to the scanning electrode. An application period of the selection signal voltage to the scanning electrode may be ½ the scanning period (half of the scanning period). The scanning period is a period in which the selection signal voltage is applied to the scanning electrode.

In the liquid crystal display apparatus, the driving voltage to be applied to the scanning electrode for scanning in each frame for matrix driving of the liquid crystal display element is given a single polarity and the polarity is reversed in every frame so that the state of single polarity of voltage applied to the liquid crystal in each frame can continuously last for a prolonged period of time. Consequently it is possible to reduce a practical waveform repeating frequency of voltage to be applied to the liquid crystal as compared with use of alternating voltage which periodically changes in polarity of waveform of voltage in each frame.

Further it is possible to decrease a value of the driving voltage to be applied to the scanning electrode to ½, and an amount of power consumed for driving the liquid crystal display element can be correspondingly reduced. Namely the power consumption for driving the liquid crystal display element can be decreased. Moreover, a scanning driving IC which is inexpensive and is relatively low in voltage resistance can be used in view of reduction of the voltage to be supplied to the scanning driving IC to ½ compared with the use of alternating voltage.

Examples of the liquid crystal to be used for the liquid crystal display element which exhibit a cholesteric phase include those which exhibit a cholesteric phase (cholesteric characteristics) at room temperature (e.g. about 25° C.). The liquid crystals exhibiting a cholesteric phase include, for example, a cholesteric liquid crystal capable of showing a cholesteric phase by itself and a chiral nematic liquid crystal composition prepared by adding a chiral material to a nematic liquid crystal. The chiral nematic liquid crystal composition can selectively reflect light in a predetermined wavelength range and can achieve a memory effect. The selective reflection wavelength can be advantageously adjusted by changing the amount of chiral material to be added.

The driving device for driving the liquid crystal display element may comprise a scanning driving IC to be connected to the plurality of scanning electrodes, a signal driving IC to be connected to the plurality of signal electrodes, and a controller for controlling these driving ICs. The controller may be adapted to control the scanning driving IC such that a selection signal voltage is successively applied to the scanning electrodes to bring the electrodes to a selective state, while it may be adapted to control the signal driving IC such that a rewriting signal voltage is applied to each signal electrode, more specifically a rewriting signal voltage corresponding to the scanning electrode in the selective state is applied to the signal electrode in synchronization with application of the selection signal voltage to each scanning electrode.

The controller may control the scanning driving IC in a manner such that the driving voltage to be applied to the scanning electrode in scanning in each frame for matrix driving of the liquid crystal display element is given a single polarity in each frame and inversion of the polarity is performed in every frame.

In order to properly drive the liquid crystal exhibiting a cholesteric phase in each pixel, a predetermined reset voltage may be applied to the scanning electrode for a specified time period (reset period) to bring the liquid crystal to a homeotropic state before a predetermined period (selection period) of applying the selection signal voltage. In this case, the selection signal voltage is a sufficient voltage to change the homeotropic liquid crystal to a desired state.

A predetermined maintaining voltage for establishing a state of the liquid crystal to be selected by the selection signal voltage may be applied to each scanning electrode for a specified period (maintaining period) after applying the selection signal voltage.

In the selection period for applying the selection signal voltage, the driving voltage for the scanning electrode may be 0V for a specified period (pre-selection period) after the reset period for applying the reset voltage and before applying the selection signal voltage, and the driving voltage for the scanning electrode may be 0V for a specified period (post-selection period) before the maintaining period for applying the maintaining voltage and after applying the selection signal voltage.

When each scanning electrode is brought to a selective state by successively applying the selection signal voltage to the plurality of scanning electrodes while applying the rewriting signal voltage corresponding to the scanning electrode in the selective state in synchronization with application of the selection signal voltage to the scanning electrode, the rewriting signal voltage may be such that the rewriting signal voltage is changed in polarity within the scanning period and effective values of positive and negative voltages of the rewriting signal voltage is substantially equal to each other within the scanning period.

With these features, when the liquid crystals corresponding to the pixels are subjected to a cross-talk due to the rewriting signal voltage applied to the signal electrode, voltages applied to the liquid crystals due to the cross-talk can be rendered substantially uniform.

However, in this case, if the application period of the selection signal voltage is as long as the scanning period, the pixel to be displayed is not be properly displayed by the rewriting signal voltage which is changed in its polarity in the scanning period.

In view of the above, it is recommendable that the application period of the selection signal voltage to be applied to the scanning electrodes is ½ the scanning period when applying the driving voltages to the plurality of scanning electrodes and the plurality of signal electrodes for matrix driving.

The pixels to be displayed can be properly displayed, if the following features are realized: an application period of the selection signal voltage is ½ the scanning period; the rewriting signal voltage is changed in its polarity within the scanning period; the effective values of positive and negative voltages of the rewriting signal voltage are substantially equal to each other within the scanning period; each of total of period(s) of the positive voltage and total of period(s) of the negative voltage is as long as the application period of the selection signal voltage.

The following also results from such features. When liquid crystals corresponding to pixels are subjected to the cross-talk due to the rewriting signal voltage applied to the signal electrode, the voltages applied to the liquid crystals corresponding to pixels due to the cross-talk can be rendered substantially uniform. Thereby it is possible to suppress a shadowing in image display from occurring in the liquid crystals subjected to the cross-talk, resulting in better image display. Furthermore, each pixel can be displayed in a planar state (selective reflective state), in a focal conic state (transparent state) or in an intermediate tone state (mixed states), for example, by shifting the phase of the rewriting signal voltage.

In the liquid crystal display apparatus and the device for driving the liquid crystal display element which have the scanning driving IC, the signal driving IC and the controller, the controller may be adapted to control the signal driving IC so as to adjust the application period of the selection signal voltage to ½ the scanning period, and may be adapted to control the signal driving IC so as to change the polarity of the rewriting signal voltage within the scanning period, so as to substantially equalize the effective values of positive and negative voltages with each other in the scanning period, and so as to allow the rewriting signal voltage to equalize each of total of period(s) of the positive voltage and total of period(s) of the negative voltage with the application period of the selection signal voltage within the scanning period.

At any rate, it is desired to equalize an application period of the rewriting signal voltage with the scanning period as far as the rewriting signal voltage is concerned in which the polarity thereof is changed within the scanning period, the effective values of positive and negative voltages are substantially equal to each other in the scanning period, and each of total of period(s) of the positive voltage and total of period(s) of the negative voltage is made equal to the application period of the selection signal voltage within the scanning period.

A rectangular pulse voltage which has a duty ratio of 50% in the scanning period and in which the absolute values of positive and negative voltages are identical with each other can be mentioned as a typical example of the rewriting signal voltage in which the polarity is changed in the scanning period, the effective values of positive and negative voltages are substantially equal to each other in the scanning period, each of the total of period(s) of the positive voltage and the total of period(s) of the negative voltage is equal to the application period of the selection signal voltage and the application period of the rewriting signal voltage is as long as the scanning period.

When the selection signal voltage is such that its application period is ½ the scanning period, and the rewriting signal voltage is, for example, a rectangular pulse voltage which has a duty ratio of 50% within the scanning period and in which the absolute values of positive and negative voltages are identical with each other, voltages to be applied to the liquid crystals corresponding to pixels due to the cross-talk can be made substantially constant, whereby the shadowing occurring due to the cross-talk in image display can be further suppressed. This matter will be described in greater detail later.

At any rate, the phase of the signal voltage may be adjusted to bring about the following: the application period of the selection signal voltage is ½ the scanning period; the rewriting signal voltage changes its polarity within the scanning period; the effective values of positive and negative voltages of the rewriting signal voltage are substantially equal to each other within the scanning period; and the rewriting signal voltage is such that each of the total of period(s) of the positive voltage and the total of period(s) of the negative voltage is as long as the application period of the selection signal voltage within the scanning period.

The voltage to be applied to the liquid crystal exhibiting a cholesteric phase can be changed by adjusting the phase of the signal voltage so that the liquid crystal can be brought to a planar state (selective reflective state), to a focal conic state (transparent state) or to a mixed state (a planar state and a focal conic state are mixed). Thereby the liquid crystal element is allowed to perform a selective reflective (colored) display, a transparent display or an intermediate tone display.

At any rate, the driving voltage may be applied to the scanning electrode by the scanning driving IC connected to a power source which can switch positive and negative of output voltage, and can switch the positive and negative of power source output voltage in every frame. Thereby, the driving voltage to be applied to the scanning electrode can be given a single polarity in each frame and the polarity can be reversed in every frame. In this way, a driving of the liquid crystal element can be realized by simple circuit structure.

The liquid crystal apparatus and the device for driving the liquid crystal display element, which have the scanning driving IC, the signal driving IC and the controller, may be provided with a power source which is connected to the scanning driving IC and which can switch positive and negative of output voltage, and the driving voltage may be applied to the scanning electrodes by the scanning driving IC connected to the power source.

In this case, the controller may control the power source and the scanning driving IC such that the power output voltage is switched from positive to negative or negative to positive in every frame, whereby the driving voltage to be applied to the scanning electrode is given a single polarity in each frame and the polarity is reversed in every frame.

The liquid crystal display element may be driven as follows. The plurality of scanning electrodes may be scanned at an interval of one electrode or plural electrodes, and remaining electrodes may be scanned in the same manner. When scanning is conducted at an interval of plural electrodes, the cycle is successively repeated, namely an interlace driving may be performed.

Figure 14A:
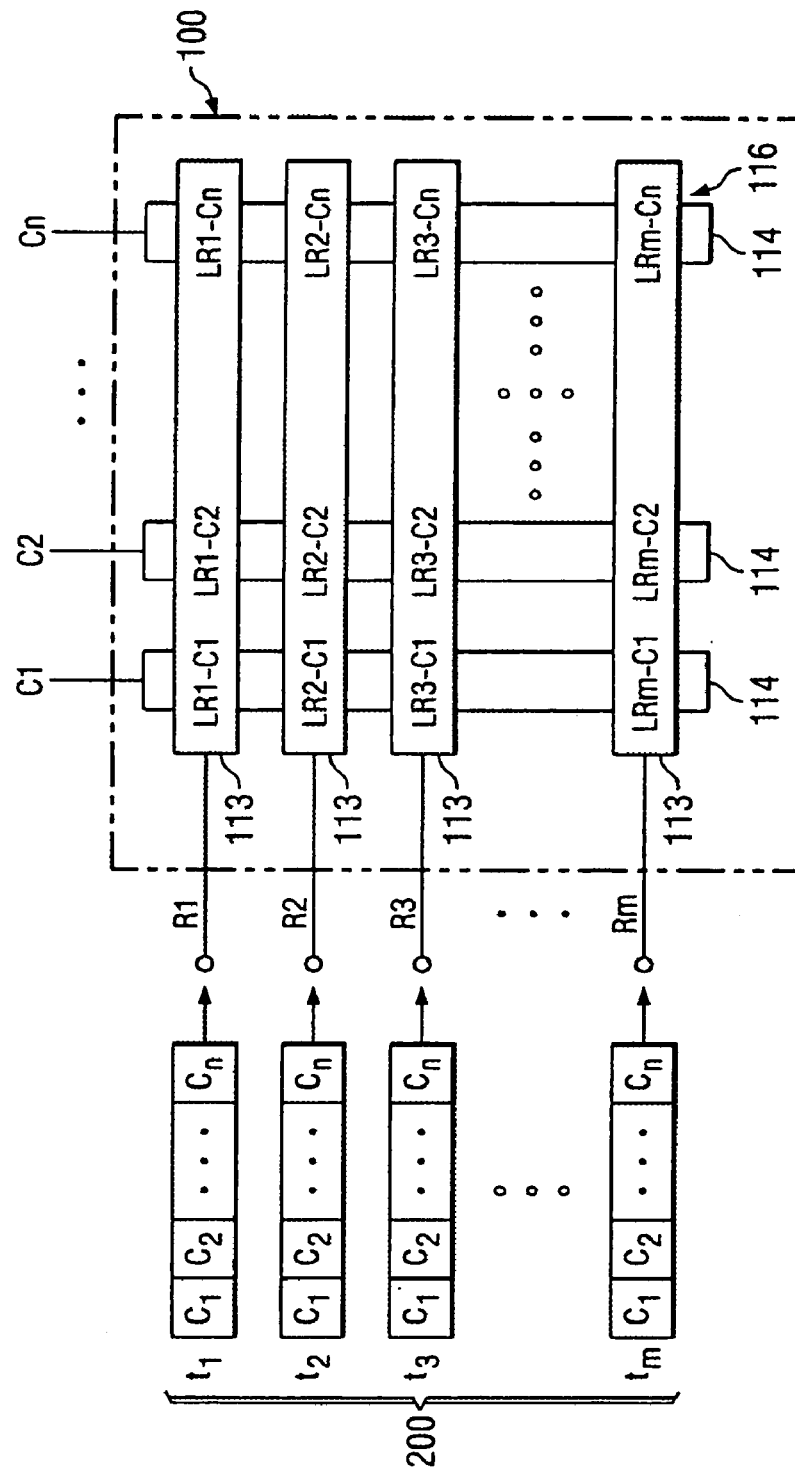
FIG. 14(A) is a chart showing the application of scanning signals to the scanning electrodes in a progressive manner.
Figure 14B:
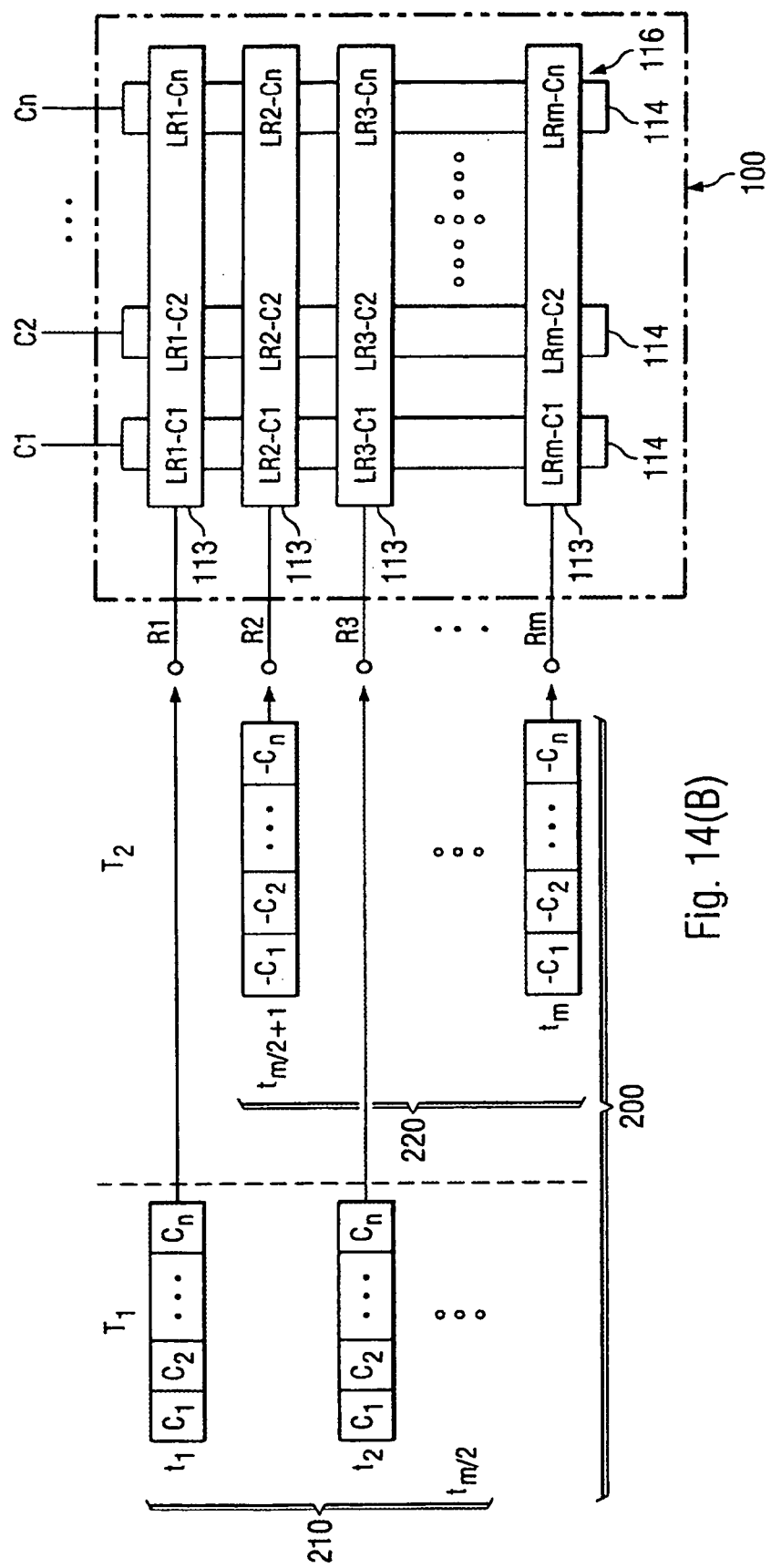
FIG. 14(B) is a chart showing the application of scanning signals to the scanning electrodes in an interlaced manner.

The plural scanning electrodes 113 (FIG. 14(A)) may be selectively (R1, R2, R3, . . . , Rm) and successively ($t_1$, $t_2$, $t_3$, . . . , $t_m$) scanned in each frame 200, namely a progressive (non-interlace) driving may be conducted. In the case of interlace driving in which one frame 200 (FIG. 14(B)) is separated into plural fields (210, 220), the polarity of selection signal voltage to be applied to the scanning electrode in each field may be reversed in every field.

Embodiments of the liquid crystal display apparatus will be described with reference to the accompanying drawings.

(Liquid Crystal Display Element, See FIG. 1)

First, a liquid crystal display element which includes a liquid crystal exhibiting a cholesteric phase (cholesteric characteristics) will be described.

FIG. 1 is a sectional view schematically showing a structure of a reflective/laminate type full-color liquid crystal display element which can be driven by simple matrix driving method.

The liquid crystal display element 100 shown in FIG. 1 comprises a light absorbing layer 121, a red display layer 111R lying on the layer 121 and capable of performing display by switching a red selective reflective state to a transparent state and vice versa; a green display layer 111G lying on the layer 111R and capable of performing display by switching a green selective reflective state to a transparent state and vice versa; and a blue display layer 111B lying on the layer 111G and capable of performing display by switching a blue selective reflective state to a transparent state and vice versa.

Each of the display layers 111R, 111G, 111B includes resin column structures 115, a liquid crystal 116 and spacers 117 between a pair of transparent substrates 112 having transparent electrodes 113, 114. Insulating films 118 and orientation-controlling films 119 are formed on the transparent electrodes 113, 114 when so required.

A seal material 120 is provided to seal the liquid crystal 116 at a periphery of the space between the substrates 112 (outside the display region).

The transparent electrodes 113, 114 are connected to a scanning driving IC 131 and a signal driving IC 132 (see FIG. 2), respectively, and a predetermined pulse voltage is applied to the transparent electrodes 113, 114, respectively. In response to the applied voltage, the display of the liquid crystal 116 is switched between a transparent state which passes visible light therethrough and a selective reflective state which selectively reflects visible light of specific wavelengths.

The transparent electrodes 113 formed in the display layers 111R, 111G, 111B, respectively are a plurality of strip electrodes extending in parallel with each other with a minute space away from each other. The transparent electrodes 114 formed in the display layers 111R, 111G, 111B, respectively are also a plurality of strip electrodes extending in parallel with each other with a minute space away from each other.

The transparent electrodes 113, 114 are opposed to each other in a direction orthogonal to each other when viewed on a plane. Voltages are successively applied to the upper and lower strip electrodes. Namely a voltage is successively applied to the liquid crystal 116 in a matrix manner to display an image. This method is called matrix driving. Each pixel corresponds to a portion at which the electrode 113 and the electrode 114 cross each other. Such matrix driving is conducted on each display layer, whereby a full color image can be displayed in the liquid crystal display element 100.

Generally speaking, in a liquid crystal display element with a liquid crystal exhibiting a cholesteric phase between two substrates, the liquid crystal is switched between a planar state and a focal conic state to display an image. When the liquid crystal is in the planar state, a light of wavelength λ=P·n (wherein P is a helical pitch of the cholesteric liquid crystal and n is an average refractive index of the liquid crystal) is selectively reflected. When the liquid crystal is in the focal conic state, light incident on the liquid crystal is scattered in the case of selective reflective wavelength of the cholesteric liquid crystal being in a range of infrared light. When the selective reflective wavelength of the cholesteric liquid crystal is shorter, light is less scattered and visible light substantially passes through the liquid crystal.

Consequently, when a selective reflective wavelength is set in a visible light range and a light absorbing layer is formed on a side opposite to the observation side of the element, a selective relective color is displayed in the planar state while a black display can be done in the focal conic state.

When a selective reflective wavelength is set at an infrared light range and a light absorbing layer is formed on a side opposed to the observation side of the element, whereby light of wavelength in the infrared light range is reflected while light of wavelength in visible light range passes therethrough in the planar state, so that a black color can be displayed. A white color can be displayed due to light scattering in the focal conic state.

In the liquid crystal display element 100 having the display layers 111R, 111G, 111B superposed on each other, when the blue display layer 111B and the green display layer 111G are brought to a transparent state wherein liquid crystal molecules are in a focal conic arrangement, and the red display layer 111R is brought to a selective reflective state wherein liquid crystal molecules are in a planar arrangement, a red display can be performed. The blue display layer 111B is brought to a transparent state wherein liquid crystal molecules are in a focal conic arrangement, and the green display layer 111G and the red display layer 111R are brought to a selective reflective state wherein liquid crystal molecules are in a planar arrangement, whereby a yellow display can be performed. Similarly the transparent state or selective reflective state is suitably selected as the state of each display layer, whereby red, green, blue, white, cyan, magenta, yellow or black color can be displayed.

Moreover, when an intermediate selective reflective state is selected as the state of display layers 111R, 111G, 111B, an intermediate color can be displayed and can be utilized for full color display.

A liquid crystal exhibiting a cholesteric phase (cholesteric characteristics) at room temperature can be preferably used as the liquid crystal 116. Especially it is suitable to use a chiral nematic liquid crystal prepared by adding a chiral material to a nematic liquid crystal in an amount sufficient to show a cholesteric phase.

The chiral material is an additive which is capable of twisting the molecules of nematic liquid crystal when added to the nematic liquid crystal. The nematic liquid crystal is imparted a helical structure of twisted molecules of liquid crystal by addition of the chiral material to the nematic liquid crystal, whereby it is caused to show a cholesteric phase.

The structure of liquid crystal display layer is not necessarily limited to the above. A resin structure in the form of a wall or the like may be used instead of the column structure 115, or such resin structure may be omitted. Useful structures of the liquid crystal layer include conventional structures such as a layer structure wherein a liquid crystal is dispersed in a three-dimensional polymer network, a layer structure wherein a three-dimensional polymer network is formed in a liquid crystal (so-called polymer-dispersed type liquid crystal composite film) and the like.

Figure 2:
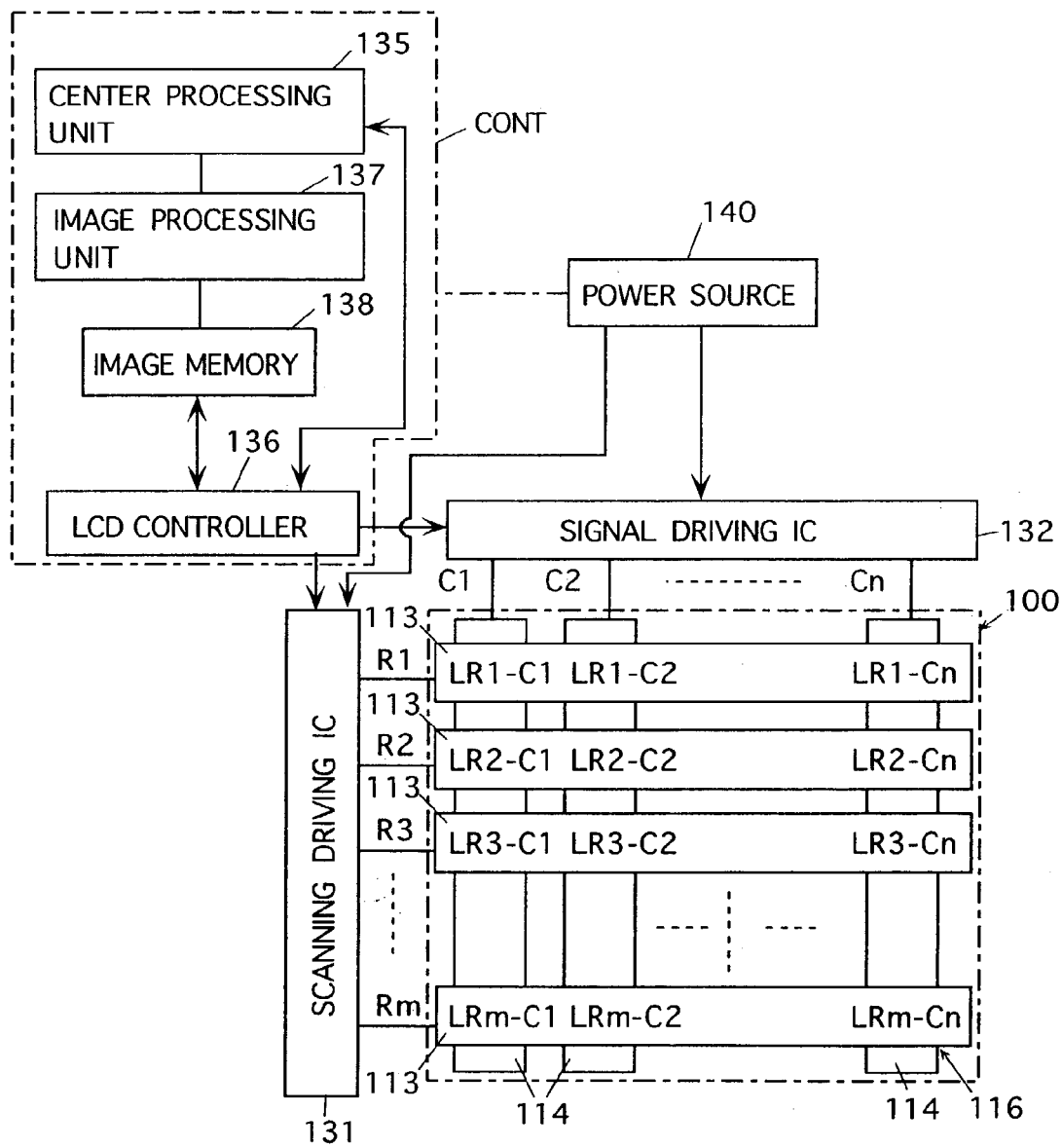
FIG. 2 is a block diagram showing an example of a driving circuit which is a main part of a driving device which applies driving voltages to the liquid crystal display layer.
Figure 3:
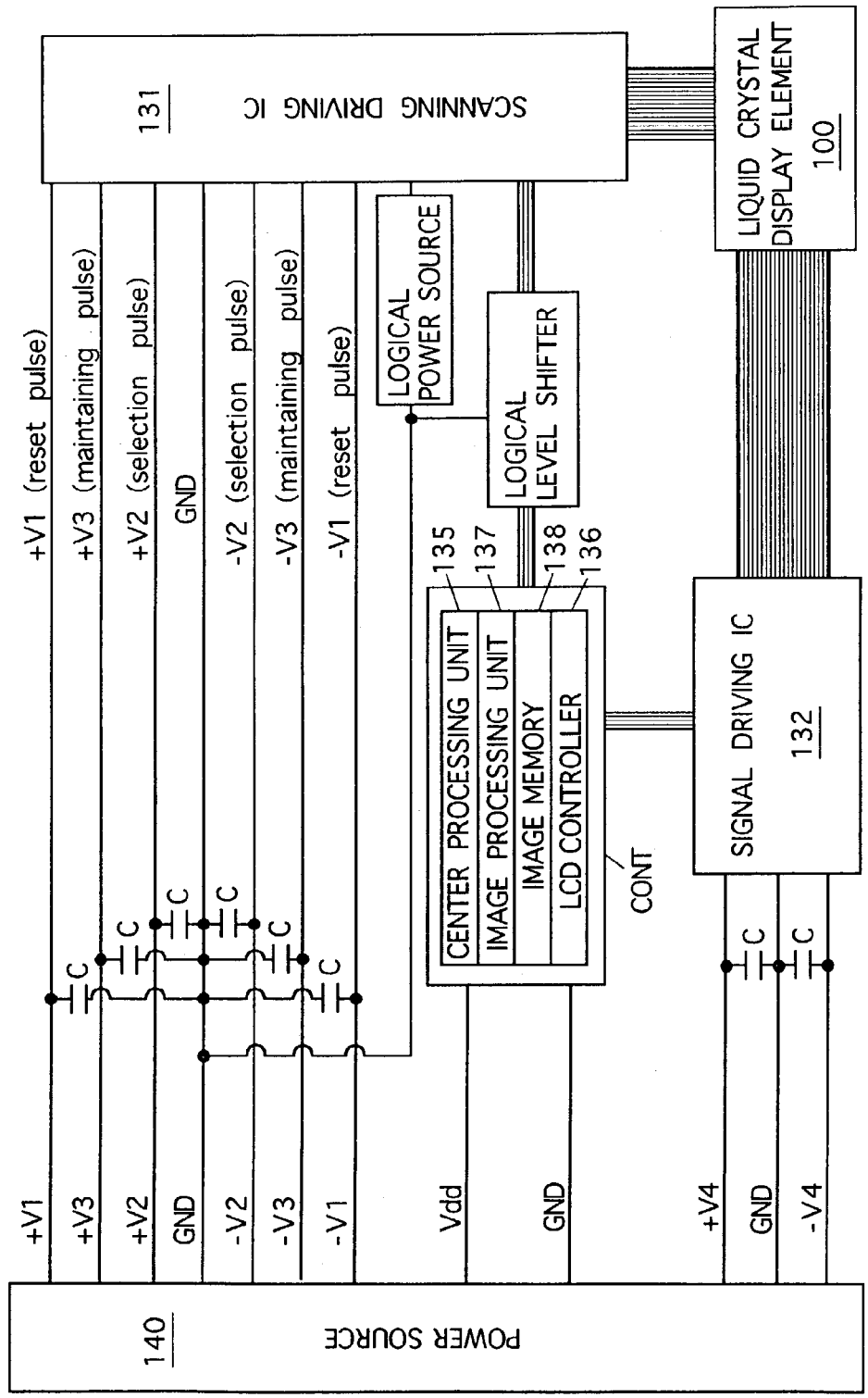
FIG. 3 shows an example of a detailed structure of the driving circuit shown in FIG. 2.

(Driving Circuit, See FIGS. 2 and 3)

FIG. 2 is a block diagram showing an example of a driving circuit which is a main part of a driving device for applying driving voltages to the liquid crystal display layer. FIG. 3 shows an example of a detailed structure of the driving circuit shown in FIG. 2. A logical power source and a logical level shifter shown in FIG. 3 are omitted in FIG. 2.

The liquid crystal display apparatus comprises the liquid crystal display element 100 and the driving device shown in FIGS. 2 and 3.

According to the illustrated liquid crystal display apparatus, driving ICs 131, 132 are controlled by an LCD controller 136 based on image data stored in an image memory 138 included in a controller CONT to be described later. Voltages are successively applied between scanning electrodes and signal electrodes in the liquid crystal display element 100, whereby an image is written in the liquid crystal display element 100.

FIGS. 2 and 3 and FIGS. 4 and 5 to be described later show the driving ICs 131, 132 provided in any of the red, green and blue display layers. More specifically, the driving ICs 131, 132 are actually provided in each of the red, green and blue display layers. The driving ICs 131, 132 are preferably provided in each of the red, green and blue display layers (namely ICs are provided in three kinds of layers, respectively). It is possible to use any one of driving ICs 131, 132 in common with these layers.

The driving device shown in FIGS. 2 and 3 include the scanning driving IC (driver) 131, the signal driving IC (driver) 132, the controller CONT and a power source 140.

The controller CONT is provided with a central processing unit (CPU) 135 adapted to control the driving device in its entirety, the LCD controller 136 adapted to control the driving ICs, an image processing unit 137 for processing image data in various manners, and the image memory 138 for storing image data. A power is supplied to the controller CONT from a power source 140. The controller CONT is connected to the signal driving IC 132 and, via a logical level shifter, to the scanning driving IC 131. The logical level shifter is a circuit adapted to shift a ground(GND) potential to 0V for compensation if the ground(GND) potential is changed from 0V despite the ground(GND) to be kept at 0V corresponding to voltages to be supplied to the scanning driving IC. The LCD controller 136 drives each driving IC according to the image data stored in the memory 138 based on directions from the CPU 135.

The pixel arrangement of the liquid crystal display element 100 is represented by a matrix comprising the plurality of scanning electrodes 113 (R1, R2 . . . Rm in FIG. 2) and the plurality of signal electrodes 114 (C1, C2 . . . Cn in FIG. 2) ("m" and "n" being a natural number) as shown in FIG. 2. The scanning electrodes R1, R2 . . . Rm are connected to output terminals of the scanning driving IC 131, and the signal electrodes C1, C2 . . . Cn are connected to output terminals of the signal driving IC 132.

The scanning driving IC 131 is connected to the scanning electrodes R1, R2 . . . Rm as described above, to the controller CONT and to the power source 140. The driving IC 131 applies a driving voltage including a reset voltage (+V1 or −V1), a selection signal voltage (+V2 or −V2) and a maintaining voltage (+V3 or −V3)) to the scanning electrodes R1, R2 . . . Rm.

The reset voltage is output, for example, as a positive reset pulse +V1 of +40V or a negative reset pulse −V1 of −40V. The selection signal voltage is output, for example, as a positive selection pulse +V2 of +15V or a negative selection pulse −V2 of −15V, while the maintaining voltage is output, for example, as a positive maintaining pulse +V3 of +25V or a negative maintaining pulse −V3 of −25V. These voltages are output from the scanning driving IC 131.

Voltage stabilizing condensers C connected to the ground (GND) corresponding to said voltages are connected to connection lines for supplying the voltages +V1, +V2 and +V3, and −V1, −V2 and −V3 to the scanning electrodes 113. The logical power source connected to the scanning driving IC 131 is provided for supply of power to the scanning driving IC 131.

The signal driving IC 132 is connected, as described above, to the signal electrodes C1, C2 . . . Cn, to the controller CONT and to the power source 140. A voltage (rewriting signal voltage (+V4, −V4)) output from the power source 140 according to directions from the controller CONT is applied to the signal electrodes C1, C2 . . . Cn, respectively.

The rewriting signal voltage is output as positive signal pulses +V4 of +3V and negative signal pulses −V4 of −3V from the signal driving IC 132.

Voltage stabilizing condensers C connected to a ground (GND) corresponding to said voltages are connected to connection lines for supplying the driving voltage (+V4, −V4) to the signal electrodes.

More specifically stated, the scanning driving IC 131 outputs the selection signal voltage to predetermined one among the scanning electrodes R1, R2 . . . Rm to bring it to a selective state while it outputs non-selection signals to other electrodes under directions from the controller CONT to bring them to a non-selective state. The scanning driving IC 131 successively applies the selection signal voltage to the scanning electrodes R1, R2 . . . Rm, while switching the electrodes. The application of the selection signal voltage to one scanning electrode is performed in a scanning period set for the scanning electrode.

On the other hand, the signal driving IC 132 simultaneously outputs the signals (rewriting signal voltages) corresponding to the image data to the signal electrodes C1, C2 . . . Cn according to directions from the controller CONT to rewrite each pixel on the scanning electrode in the selective state. For example, if a scanning electrode Ra is selected ("a" of the Ra is a natural number satisfying "a"≦m), pixels LRa-C1 . . . LRa-Cn corresponding to intersections between the scanning electrode Ra and the signal electrodes C1, C2 . . . Cn are rewritten at the same time. A voltage difference between the selection pulse voltage (selection signal voltage) applied to the scanning electrode and the signal pulse voltage (rewriting signal voltage) applied to the signal electrode in each pixel is a voltage for rewriting the pixel so that the pixel is rewritten according to the voltage.

The controller CONT is adapted to control the scanning driving IC 131 such that the driving voltage to be applied to the scanning electrodes R1, R2 . . . Rm in scanning operation in each frame for matrix driving of the liquid crystal display element 100 has a single polarity in each frame and the polarity of the driving voltage is reversed in every frame.

More specifically stated, when scanning is performed in odd-numbered frames, the scanning driving IC 131 successively applies the positive reset pulse voltage +V1, the positive selection pulse voltage +V2 and the positive maintaining pulse voltage +V3 to each scanning electrode R1, R2 . . . Rm while the signal driving IC 132 applies the signal pulse ±V4 to each signal electrode C1, C2 . . . Cn.

When scanning is performed in even-numbered frames, the scanning driving IC 131 successively applies the negative reset pulse voltage −V1, the negative selection pulse voltage −V2 and the negative maintaining pulse voltage −V3 to each scanning electrode R1, R2 . . . Rm while the signal driving IC 132 applies the signal pulse ±V4 to each signal electrode C1, C2 . . . Cn (see FIGS. 6 to 8).

In the foregoing operation, the application period Tsp of the selection pulse voltage (selection signal voltage) (+V2 or −V2) is ½ the scanning period Tss and the signal pulse ±V4 is a voltage which is changed in polarity within the scanning period Tss and effective values of positive and negative voltages thereof are substantially equal to each other within the scanning period Tss.

Further the signal pulse is such that each of total of period(s) of the positive voltage and total of period(s) of the negative voltage within the scanning period Tss is as long as the application period Tsp of the selection pulse.

As described above, the controller CONT controls the scanning driving IC 131 such that the application period Tsp of the selection pulse (+V2 or −V2) is ½ the scanning period Tss and controls the signal driving IC 132 such that the signal pulse ±V4 is a voltage which is changed in polarity within the scanning period Tss; the effective values of the positive and negative voltages of the signal pulse are substantially equal to each other within the scanning period Tss; and the signal pulse is such that each of total of period(s) of the positive voltage and total of period(s) of the negative voltage within the scanning period is as long as the application period of selection pulse (+V2, −V2). This matter will be described in more detail in respect of driving principle and example of basic driving.

The signal pulse voltage ±V4 is a rectangular pulse voltage which has a duty ratio of 50% and the absolute values of positive and negative voltages (+V4, −V4) are identical with each other.

In this driving device, the power source 140 can supply both positive and negative voltages at least all the time during driving operation. The driving voltage is applied to the scanning electrodes R1, R2 . . . Rm by the scanning driving IC connected to the power source 140.

However, the supply of power is not limited to the above. The driving voltage may be applied to the scanning electrodes R1, R2 . . . Rm by the scanning driving IC connected to a power source which can switch output voltages from positive to negative and vice versa.

Figure 4:
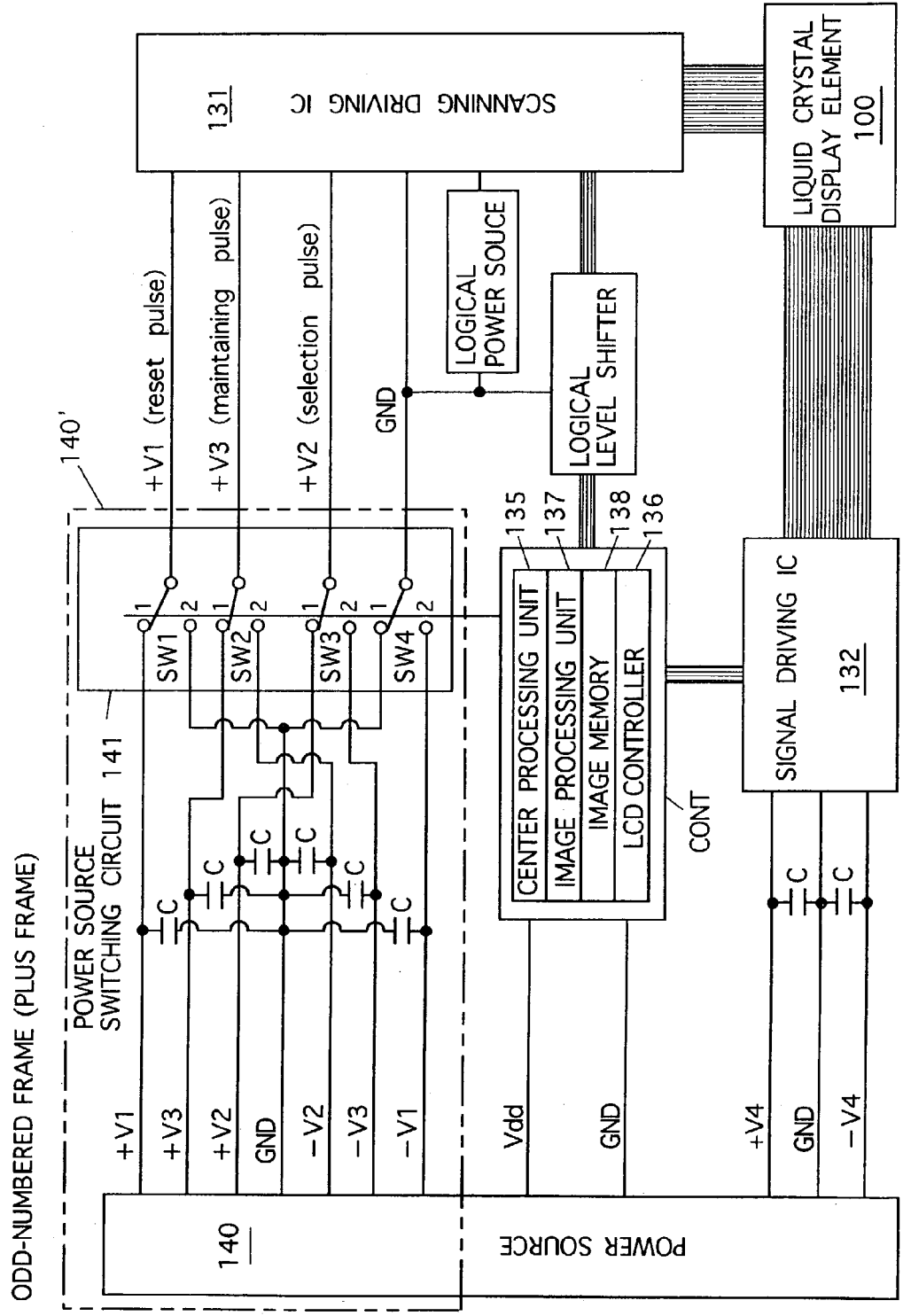
FIG. 4 shows another example of a detailed structure of the driving circuit shown in FIG. 2, and shows a state of odd-numbered frame (plus frame) in which switching elements are changed over to a side 1.
Figure 5:
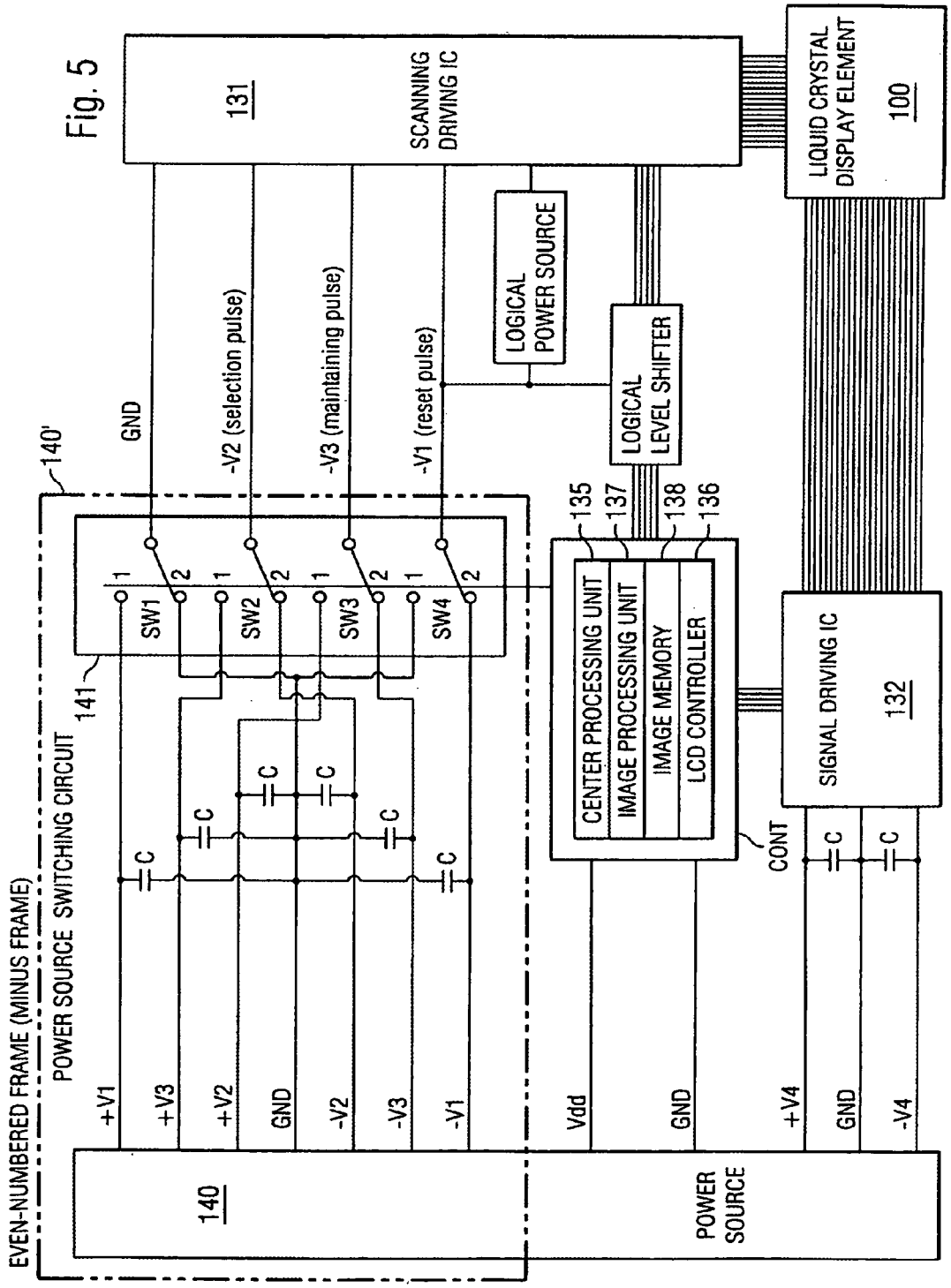
FIG. 5 shows a state of even-numbered frame (minus frame) in the circuit shown in FIG. 4, in which the switching elements are changed over to a side 2.

FIGS. 4 and 5 show another example of structure of a driving circuit. In the structure of the circuit shown in FIGS. 4 and 5, a power source switching circuit 141 is provided between the power source 140 and the scanning driving IC in the circuit structure shown in FIG. 3.

In the structure of the circuit shown in FIGS. 4 and 5, the power source 140 and the power source switching circuit 141 constitutes a power source 140' which can switch positive and negative of output voltage.

The power source 140' is connected to the controller CONT and has 4 switching elements SW1 to SW4.

The elements SW1 to SW4 can be simultaneously switched under directions from the controller CONT to a state of applying a positive driving voltage (side 1 in the drawing) or to a state of applying a negative driving voltage (side 2 in the drawing). When the switching elements are in the state of side 1, the power source 140' can supply positive voltages +V1, +V2, +V3 from the power source 140 to the scanning driving IC 131. On the other hand, when the switching elements are in the state of side 2, the power source 140' can supply negative voltages −V1, −V2, −V3 from the power source 140 to the scanning driving IC 131.

In the driving device having the circuit structure shown in FIGS. 4 and 5, the controller CONT can control the power source 140' and the scanning driving IC 131 so that the driving voltage to be applied to the scanning electrodes 113 by switching from positive voltages +V1, +V2, +V3 to negative voltages −V1, −V2, −V3 or vice versa is given a single polarity in each frame, and polarity inversion is effected in every frame. According to the driving device, the driving of liquid crystal display element can be realized by a simple circuit structure. FIG. 4 shows the state of odd-numbered frames (plus frames) in which the switching elements SW1 to SW4 are switched to the side 1. FIG. 5 shows the state of even-numbered frames (minus frames) in which the elements SW1 to SW4 are switched to the side 2.

An image can be rewritten usually by successively selecting all scanning lines. When an image is partially rewritten, specific scanning lines alone are successively selected in a way to include a part to be rewritten. Thereby only the required part can be rewritten in a short time. In the circuit structure shown in FIGS. 4 and 5, the voltages to be supplied to the scanning driving IC is ½ the voltages in the structure in FIG. 3. Consequently the scanning driving IC which is inexpensive and which is relatively low in voltage resistance as compared with the structure of FIG. 3 can be used.

(Driving Principle and an Example of Basic Driving, See FIGS. 6 to 11)

The basic principle of the method of driving the liquid crystal display element 100 is first described. Hereinafter, this matter is explained with reference to specific example using pulse waveforms. However, the driving method is not limited to these waveforms.

Figure 6A:
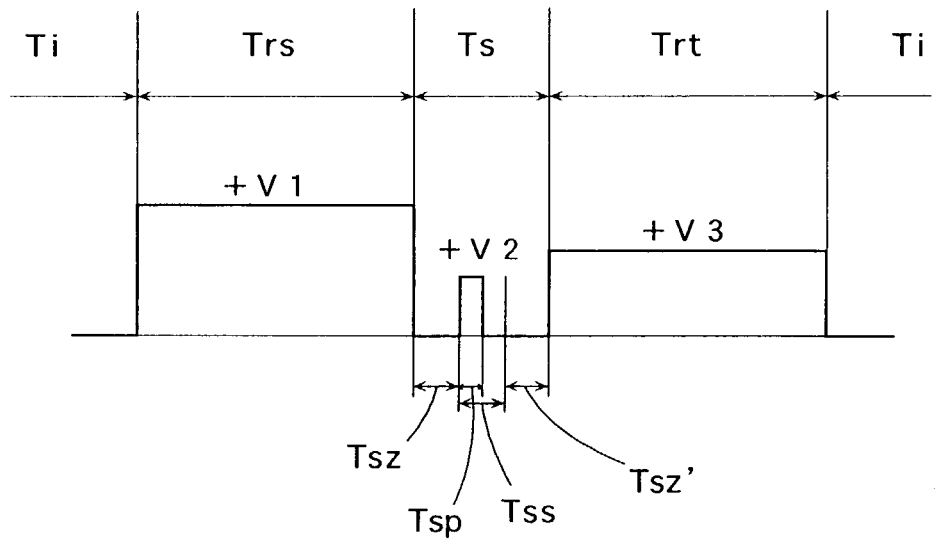
FIG. 6(A) shows a basic driving waveform which is output from a scanning driving IC to each scanning electrode in the odd-numbered frames.
Figure 6B:
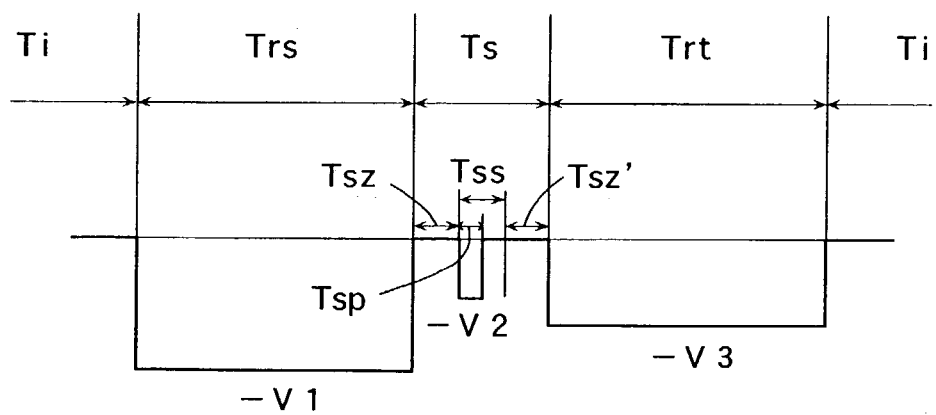
FIG. 6(B) shows a basic driving waveform which is output from the scanning driving IC to each scanning electrode in the even-numbered frames.

FIG. 6(A) shows an example of basic driving waveform in odd-numbered frame (plus frame) which is output from the scanning driving IC 131 to each scanning electrode, and FIG. 6(B) shows an example of basic driving waveform in even-numbered frame (minus frame) which is output from the scanning driving IC 131 to each scanning electrode.

Figure 7:
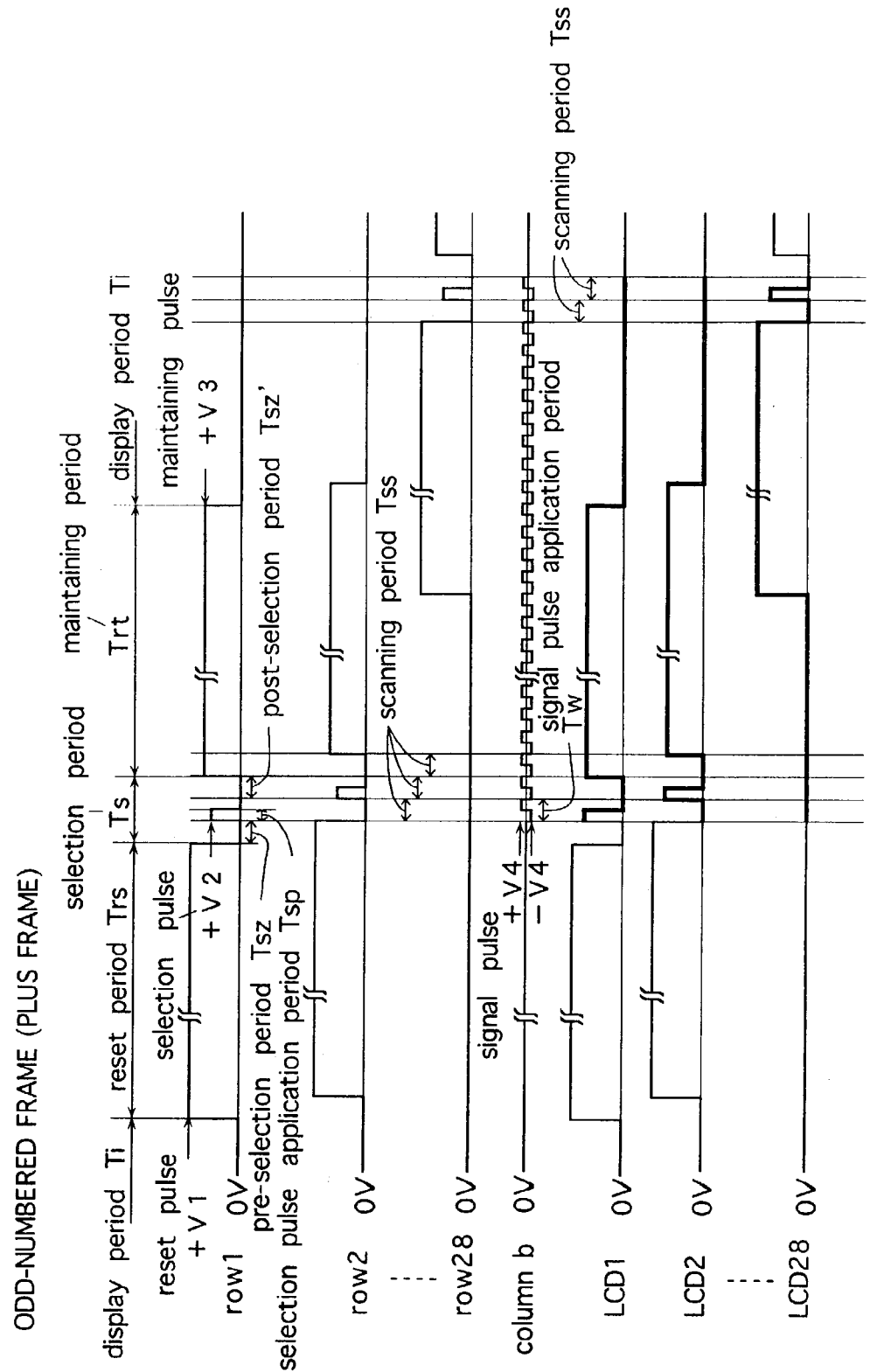
FIG. 7 shows waveforms of voltages which are output from the scanning driving IC to the scanning electrodes, a waveform of voltage which is output from a signal driving IC to one of signal electrodes, and waveforms of voltages which are applied to liquid crystals corresponding to pixels, in one of the odd-numbered frames.
Figure 8:
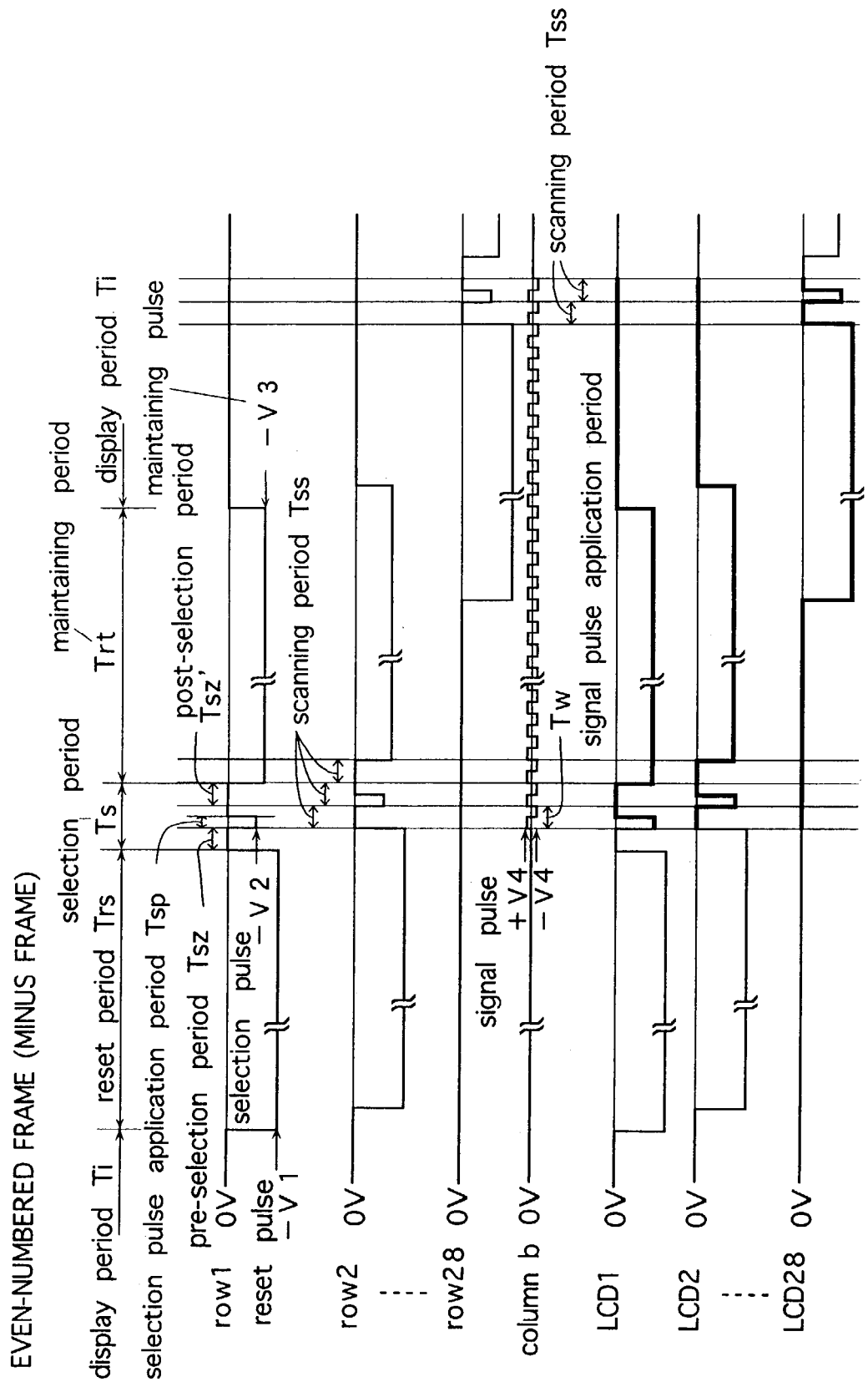
FIG. 8 shows waveforms of voltages which are output from the scanning driving IC to the scanning electrodes, a waveform of voltage which is output from the signal driving IC to one of the signal electrodes, and waveforms of voltages which are applied to the liquid crystals corresponding to pixels, in one of the even-numbered frames.

FIGS. 7 and 8 show waveforms of voltages which are output from the scanning driving IC 131 to each scanning electrode 113 (row electrode), a waveform of voltage which is output from the signal driving IC 132 to one signal electrode (column electrode), and waveforms of voltages as applied to the liquid crystals (indicated as LCD 1 to LCD 28 in the drawing) corresponding to pixels by these voltages. FIG. 7 shows waveforms of voltages in odd-numbered frame, and FIG. 8 shows waveforms of voltages in even-numbered frame.

FIGS. 7 and 8 indicate an example of basic driving in which a selection pulse voltage (selection signal voltage) is successively output to the plurality of scanning electrodes 113 (illustrated as 28 row electrodes 1, 2–28 in the drawings) and a signal pulse (rewriting signal voltage) is output from one signal electrode (depicted as a column b in the drawings, the "b" being a natural number satisfying b≦n) which is one of the plurality of signal electrodes 114 (a plurality of column electrodes).

The waveform of signal pulse output from the column b shown in the drawings is a waveform capable of successively outputting a pulse which selects the selective reflective state of the liquid crystal in any of scanning periods Tss. It is possible to output any of a waveform of signal pulse selecting a transparent state, a waveform of signal pulse selecting a selective reflective state and a waveform of signal pulse selecting a mixed state (mixture of these states) from the column b. This matter will be described in more detail later.

Indicated at LCD 1, 2 to 28 in the drawings are liquid crystals corresponding to the pixels intersectionally formed between the scanning electrodes (rows 1, 2–28) and the signal electrode (column b), and are waveforms of voltages applied to the liquid crystals corresponding to the pixels. A cross-talk pulse due to the signal pulse applied to the signal electrode is applied to the liquid crystals. FIGS. 7 and 8 indicate, in thick lines, ranges to which the cross-talk pulse is applied. This matter will be explained in detail later.

In this driving, as described above, the driving voltage to be applied to the scanning electrodes (rows 1, 2 to 28) in scanning is given a single polarity in each frame and the polarity is reversed in every frame. For example, the driving voltage is given a single polarity in scanning in one frame, namely until the scanning operation in one frame is completed, using the first scanning electrode (row 1) to the last scanning electrode (row 28). Then the polarity of the driving voltage is reversed for scanning in next one frame.

A driving period is roughly divided into a reset period Trs, a selection period Ts, a maintaining period Trt and a display period Ti. The selection period Ts is subdivided into a selection pulse application period (application period of selection signal voltage) Tsp, a pre-selection period Tsz and a post-selection period Tsz'. The reset period Trs and the maintaining period Trt are, for instance, 48 ms. The selection period Ts is, for example, 0.6 ms. The pre-selection period Tsz and the post-selection period Tsz' are both, for example, ⅓ (0.2 ms) the selection period Ts (0.6 ms). The scanning period Tss is ⅓ (0.2 ms) the selection period Ts (0.6 ms). The selection pulse application period Tsp is ½ (0.1 ms) the scanning period Tss as described above.

As illustrated in FIGS. 6 to 8, in basic driving waveforms, a reset pulse (positive pulse +V1 in odd-numbered frames and negative pulse −V1 in even-numbered frames) is applied in the reset period Trs. In the selection period Ts, a selection pulse (positive pulse +V2 in odd-numbered frames and negative pulse −V2 in even-numbered frames) is applied in the selection pulse application period Tsp. In the scanning period Tss including the period Tsp, a signal pulse ±V4 is applied from the signal driving IC 132. The signal pulse ±V4 is determined based on the image data. As described above, the signal pulse ±V4 is a rectangular pulse which has a duty ratio of 50% and in which the absolute values of positive and negative voltages (+V4, −V4) are identical with each other. In the basic driving waveform, the voltage is zero in the pre-selection period Tsz and the post-selection period Tsz'. Further, a maintaining pulse (positive pulse +V3 in odd-numbered frames, and negative pulse −V3 in even-numbered frames) is applied in the maintaining period Trt.

The liquid crystal operates as follows. First, when the reset pulse of +V1 (odd-numbered frames) or −V1 (even-numbered frames) is applied in the reset period Trs, the liquid crystal is reset to a homeotropic state. The reset period Trs proceeds to the selection pulse application period Tsp via the pre-selection period Tsz (during which the liquid crystal becomes slightly retwisted). The waveform of the pulse to be applied to the liquid crystal in the period Tsp is varied with a pixel finally selecting a planar state or with a pixel finally selecting a focal conic state.

FIGS. 6 to 8 show cases of selecting a planar state. When a focal conic state is to be selected, the phase of the signal pulse is shifted to an extent corresponding to a half-period compared with the case of selecting a planar state.

The case of selecting a planar state will be described. In this case, in the selection pulse application period Tsp, a voltage of [(+V2)−(−V4)] in odd-numbered frames or a voltage of [(−V2)−(+V4)] in even-numbered frames is applied to the liquid crystal to bring the liquid crystal to a homeotropic state again. Thereafter the liquid crystal becomes slightly retwisted in the post-selection period Tsz'. Then when the maintaining pulse of +V3 (odd-numbered frames) or −V3 (even-numbered frames) is applied in the maintaining period Trt, the liquid crystal having become slightly retwisted in the post-selection period Tsz' becomes further loose by application of the maintaining pulse and is brought to a homeotropic state.

The liquid crystal in the homeotropic state is brought to a planar state by change-over to voltage zero and is fixed in the planar state.

On the other hand, when a focal conic state is finally selected, a voltage of [(+V2)−(+V4)] in odd-numbered frames or a voltage of [(−V2)−(−V4)] in even-numbered frames is applied in the selection pulse application period Tsp. In post-selection period Tsz', the liquid crystal becomes retwisted and a state having a helical pitch spreading approximately twice.

Subsequently, the maintaining pulse of +V3 (odd-numbered frames) or −V3 (even-numbered frames) is applied in the maintaining period Trt. The liquid crystal having become slightly retwisted in the post-selection period Tsz' is brought to a focal conic state by application of the maintaining pulse. The liquid crystal in the focal conic state is fixed in the focal conic state even by change-over to voltage zero.

According to the above-described method and device for driving the liquid crystal display element and liquid crystal display apparatus, when the scanning operation is performed in each frame for matrix driving of the liquid crystal display element 100, the driving voltage to be applied to the scanning electrodes 113 is given a single polarity in each frame and the polarity is reversed in every frame, whereby the state of single polarity of the voltage to be applied to the liquid crystal 116 in each frame can continuously last for a prolonged period of time. Consequently compared with use of, for example, an alternating voltage whose polarity of voltage waveform is periodically changed as a voltage to be applied to the liquid crystal 116, it is possible to reduce a waveform repeating frequency of voltage to be applied to the liquid crystal 116, and the value of driving voltage to be applied to the scanning electrode 113 can be decreased by ½, thereby correspondingly lowering the consumption of power for driving the liquid crystal display element 100. Namely the liquid crystal display element 100 can be driven by reduced power consumption.

As set forth above, the final display state of the liquid crystal can be selected by the pulse to be applied to the liquid crystal in the selection pulse application period Tsp. An intermediate tone display can be achieved by adjusting a voltage value of pulse, pulse width and/or phase, more specifically by adjusting the waveform of the signal pulse to be applied to the signal electrode in accordance with image data.

The following description will be made about an intermediate tone display performed by changing a phase of the signal pulse to be applied to the signal electrode.

Figure 9:
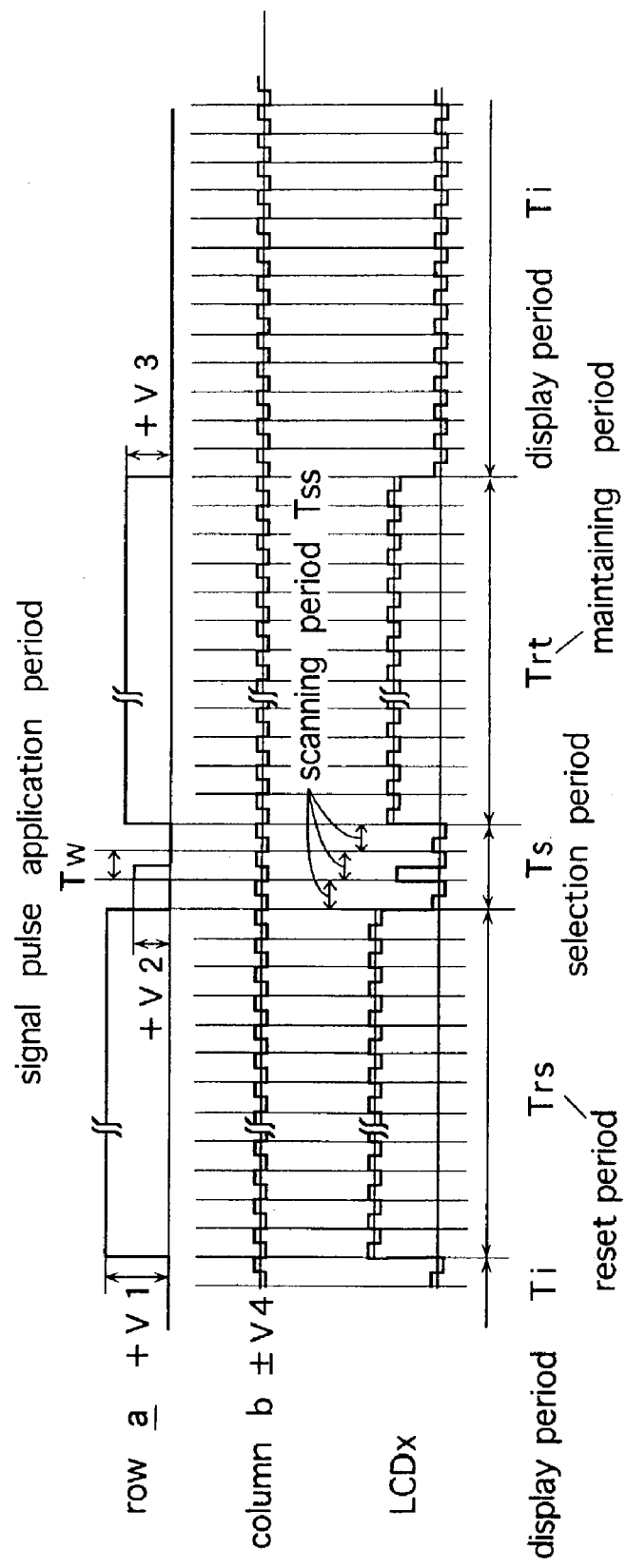
FIG. 9 shows a waveform of selection pulse which is output to one of row electrodes (scanning electrodes), a waveform of signal pulse which is output to one of column electrodes (signal electrodes) and a waveform applied to the liquid crystal by these voltages for finally selecting the liquid crystal in a maximum selective reflection state, in one of the odd-numbered frames.
Figure 10:
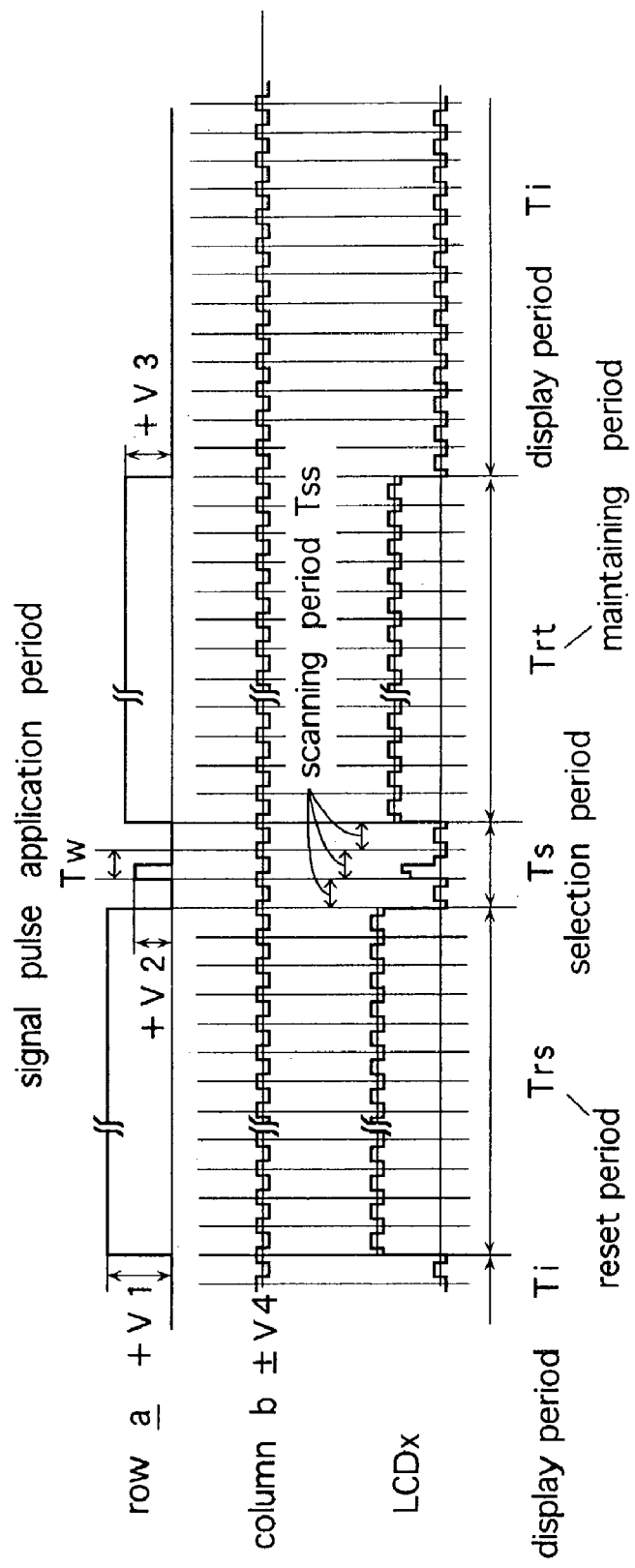
FIG. 10 shows a waveform of selection pulse which is output to one of the row electrodes, a waveform of signal pulse which is output to one of the column electrodes and a waveform which is applied to the liquid crystal by these voltages for finally selecting the liquid crystal in an intermediate tone display state, in one of the odd-numbered frames.
Figure 11:
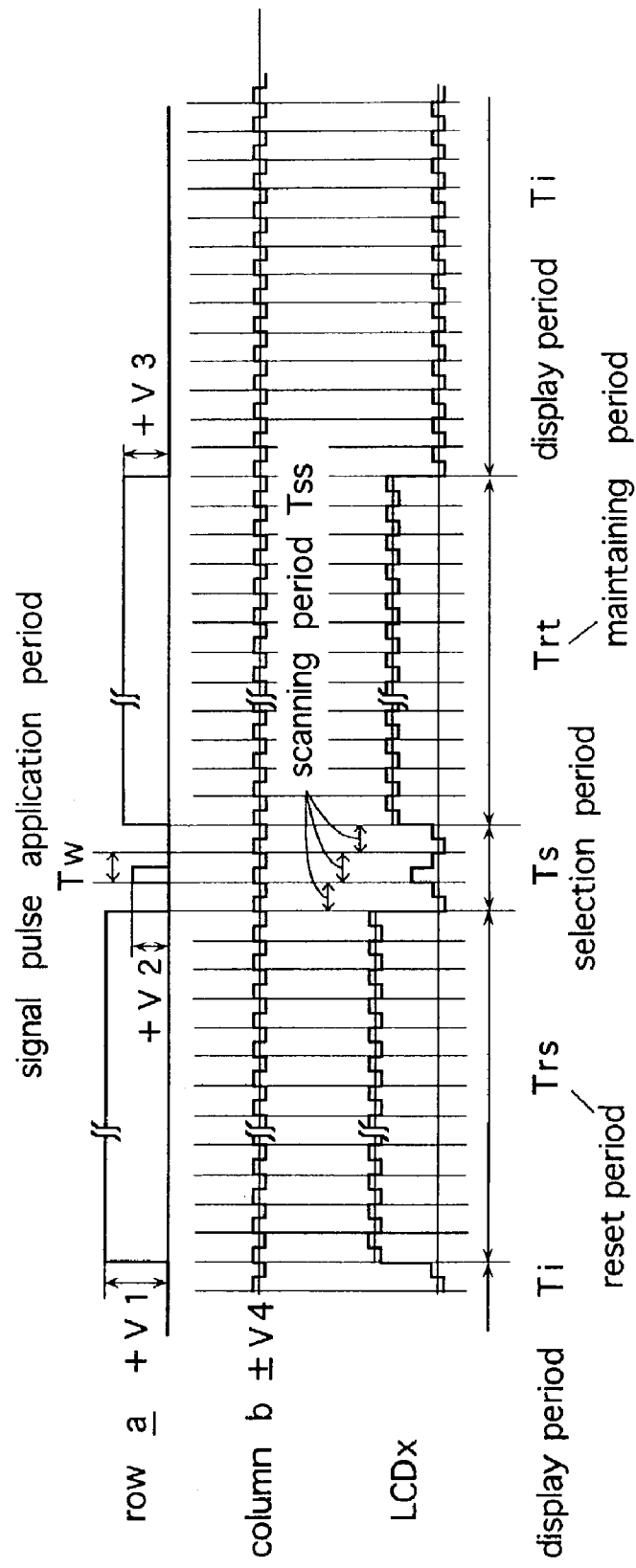
FIG. 11 shows a waveform of selection pulse which is output to one of the row electrodes, a waveform of signal pulse which is output to one of the column electrodes and a waveform which is applied to the liquid crystal by these voltages for finally selecting the liquid crystal in a transparent state, in one of the odd-numbered frames.

FIGS. 9 to 11 show a waveform of the selection pulse voltage which is output to a single row a selected from the rows 1 to 28, a waveform of the signal pulse voltage which is output to the column b and a waveform of a voltage applied to the liquid crystal LCDx by the selection pulse voltage and the signal pulse voltage in odd-numbered frames (plus frames).

FIG. 9 indicates waveforms for finally setting the liquid crystal in a maximum selective reflective state. FIG. 10 illustrates waveforms for finally setting the liquid crystal in an intermediate tone display state. FIG. 11 shows waveforms for finally setting the liquid crystal in a transparent state.

Figure 12:
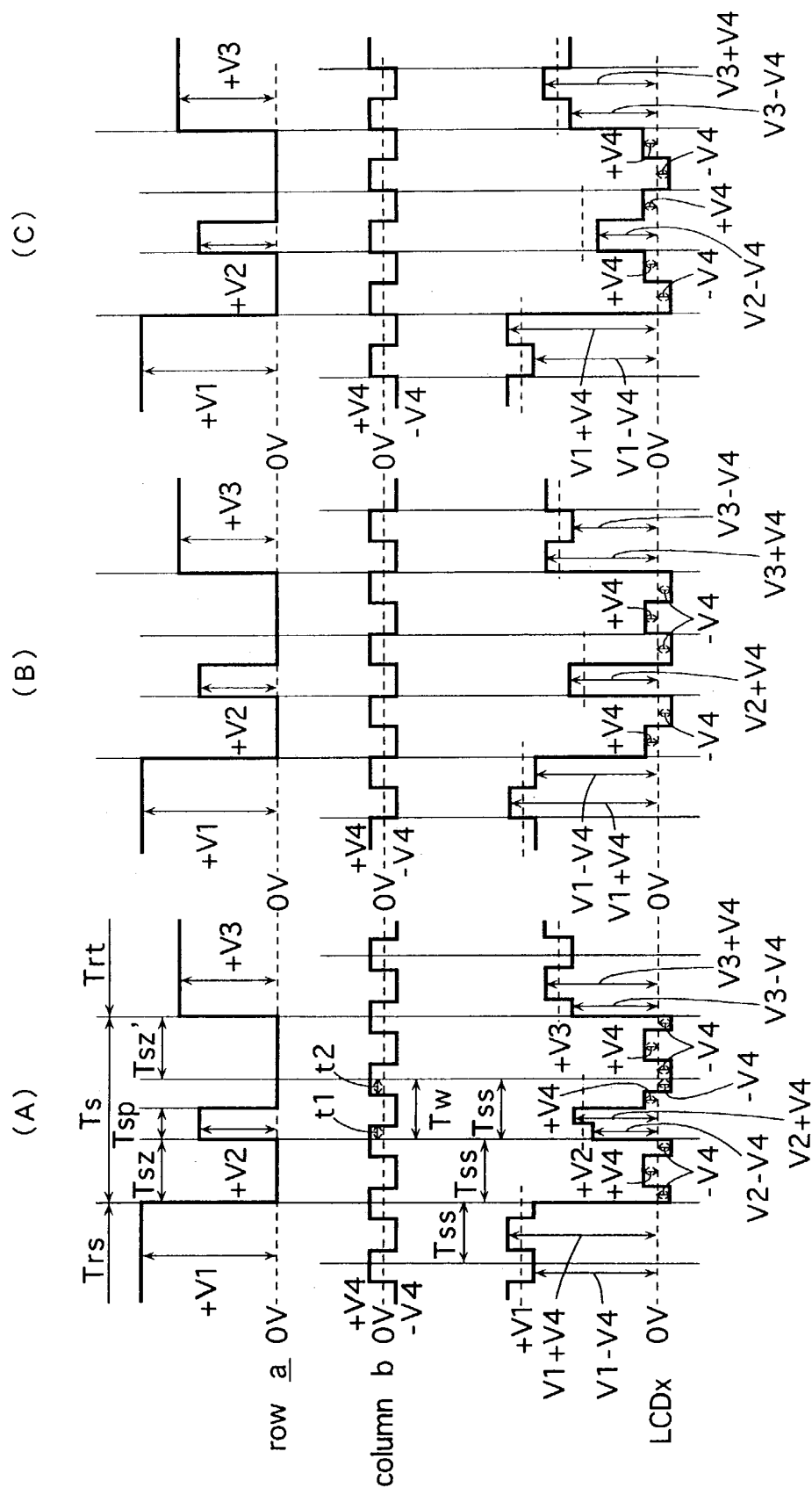
FIG. 12(A), FIG. 12(B), and FIG. 12(C) show enlarged portions, chiefly in selection periods, shown in FIG. 10, FIG. 9 and FIG. 11, of a waveform of selection pulse which is output to the row electrode, a waveform of signal pulse which is output to the column electrode, and a waveform applied to the liquid crystal by these voltages.

FIG. 12(A), FIG. 12(B), and FIG. 12(C) show the waveform of the selection pulse voltage to be output to the row a, the waveform of the signal pulse voltage to be output to the column b, and the waveform of the voltage to be applied to the liquid crystal LCDx, chiefly those in the selection period, these views being enlarged from those shown in FIG. 10, FIG. 9 and FIG. 11, respectively.

As shown in FIG. 12(A) to FIG. 12(C), the signal pulse of ±V4 to be applied to the column b is such that a total of minus period(s) (or total of plus period(s)) of the signal pulse voltage during the signal pulse application period Tw (scanning period Tss) is as long as the selection pulse application period Tsp. Accordingly, it is possible that a rise or fall timing of the signal pulse to be applied to the column b in synchronization with application of the selection pulse to the row a is shifted within a period from zero to the Tsp (½ the scanning period Tss) (see t1 (or t2) in FIG. 12(A)), thereby changing a width of each of highest portion |V2+V4| and lowest portion |V2−V4| of the pulse voltage to be applied to the liquid crystal LCDx within the selection pulse application period and controlling the final state of the liquid crystal.

As shown in FIG. 12(A), in the waveform of the voltage for selecting the intermediate tone display state of the liquid crystal, a total of application periods of highest portion |V2+V4| and lowest portion |V2−V4| of the pulse voltage to be applied to the liquid crystal LCDx within the selection pulse application period is equal to the selection pulse application period Tsp. As shown in FIG. 12(B), in the waveform of the voltage for selecting the selective reflective state of the liquid crystal, a width of the highest portion |V2+V4| of the pulse voltage to be applied to the liquid crystal LCDx within the selection pulse application period is equal to the width of the selection pulse application period Tsp. As shown in FIG. 12(C), in the waveform of voltage for selecting the transparent state of the liquid crystal, a width of the lowest portion |V2−V4| of the pulse voltage to be applied to the liquid crystal LCDx within the selection pulse application period is equal to the width of the selection pulse application period Tsp.

The operation in the minus frame in which a minus voltage is applied to the rows is the same in the plus frame except that the polarity of the voltage to be applied to the rows and the polarity of the voltage to be applied to the columns are reversed.

As indicated with thick lines in FIGS. 7 and 8, any of the waveforms of the voltages to be applied to the liquid crystals LCD1, LCD2 suffers a cross-talk due to the signal pulse to be applied to the signal electrode.

However, the waveform of the signal pulse to be applied to the column b is a rectangular pulse waveform which has a duty ratio of 50% and in which the absolute values of positive and negative voltages are identical with each other. In any waveform for selecting a display state of the liquid crystal, the voltage applied to the liquid crystal in the reset period and the voltage applied to the liquid crystal in the maintaining period are constant, respectively as shown in FIG. 12(A) to FIG. 12(C), since an effective voltage is $\sqrt{\{[(V1+V4)^2+(V1-V4)^2]/2\}}$ in the reset period and an effective voltage is $\sqrt{\{[(V3+V4)^2+(V3-V4)^2]/2\}}$ in the maintaining period.

As described above, if the selection pulse voltage to be applied to the row a is a voltage whose application period Tsp is ½ the scanning period Tss and the signal pulse voltage to be applied to the column b has a rectangular pulse waveform which has a duty ratio of 50% and in which the absolute values of positive and negative voltages are identical with each other, voltages applied to the liquid crystals LCD 1, LCD 2 to LCD 28 corresponding to pixels due to the cross-talk can be made substantially constant, whereby a shadowing occurring in image display due to the cross-talk can be suppressed.

The foregoing embodiments use a signal pulse which has a duty ratio of 50% and in which a positive or negative continuous time is as long as Tsp. However, if a duty ratio is 50%, an effect of suppressing the shadowing can be achieved without the feature that a positive or negative continuous time is as long as as Tsp. In that case, the signal pulse may be output as separated into two while maintaining a duty ratio at 50%.

However, this case involves twice the inversion frequency of signal pulse and twice the power consumption of the display element (display panel) arising from the signal pulse. FIG. 13(A) to FIG. 13(C) show an example of signal pulse wherein continuous time T1 or T2 of positive or negative voltage is not as long as the selection signal application period Tsp. In this example, intermediate tone display state can be selected by applying signal pulse shown in FIG. 13(A) in which total sum of the continuous times T1 and T2 is kept to the period Tsp. By varying the ratio of the continuous times T1 and T2 with keeping the sum of the times T1 and T2 to the period Tsp, various tone display states including the maximum selective reflective display state (the planar state: T1=0, T2=Tsp: FIG. 13(B)) and the transparent state (the focal conic state: T1=Tsp, T2=0: FIG. 13(C)) can be selected.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. A liquid crystal display apparatus comprising:
a liquid crystal display element that includes a layer of a liquid crystal exhibiting a cholesteric phase, and a plurality of scanning and signal electrodes extending across each other with the liquid crystal layer therebetween; and
a driving device for driving the liquid crystal display element by simple matrix driving,
wherein the driving device is configured such that (1) a driving voltage of single polarity including a selection signal voltage, a reset voltage and a maintaining voltage is applied to the scanning electrodes in each frame, and the polarity of the driving voltage is reversed in every frame; (2) the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode in synchronization with application of the selection signal voltage to the scanning electrode; (3) the reset voltage is applied to the scanning electrode to bring the liquid crystal to a homeotropic state before applying the selection signal voltage, and the maintaining voltage is applied to the scanning electrode to establish a state of the liquid crystal to be selected by the selection signal voltage after applying the selection signal voltage; and (4) the rewriting signal voltage to be applied to the signal electrode is changed in polarity within the scanning period, and effective values of positive voltage and negative voltage of the rewriting signal voltage are substantially equal to each other within the scanning period.

2. The liquid crystal display apparatus according to claim 1, wherein the liquid crystal display element can maintain a display without application of voltage.

3. The liquid crystal display apparatus according to claim 1, wherein the driving device is configured such that a period is set for bringing the voltage to be applied to the scanning electrode to 0V between application of the reset voltage and application of the selection signal voltage and/or between application of the maintaining voltage and application of the selection signal voltage.

4. The liquid crystal display apparatus according to claim 1, wherein the driving device is capable of varying a density of an image to be finally displayed by adjusting a phase of the rewriting signal voltage to be applied to the signal electrode in synchronization with application of the selection signal voltage to the scanning electrode.

5. The liquid crystal display apparatus according to claim 1, wherein the reset voltage and the maintaining voltage to be applied to the scanning electrode are different in voltage value from the selection signal voltage, respectively.

6. The liquid crystal display apparatus according to claim 1, wherein an application period of the selection signal voltage to the scanning electrode is half of the scanning period.

7. A liquid crystal display apparatus comprises a liquid crystal display element, and a driving device for driving the liquid crystal display element by simple matrix driving, wherein the liquid crystal display element includes a liquid crystal layer, and has a plurality of scanning electrodes and a plurality of signal electrodes extending across each other with the liquid crystal layer therebetween, wherein the driving device is configured such that a driving voltage of single polarity including a selection signal voltage is applied to the scanning electrodes in each frame, and the polarity of the driving voltage is reversed in every frame; the scanning electrodes are successively brought to a selected state by applying the selection signal voltage to each scanning electrode in a scanning period set for the scanning electrode, while a rewriting signal voltage corresponding to each scanning electrode in the selected state is applied to each signal electrode substantially simultaneously with application of the selection signal voltage to at least one other scanning electrode; and the rewriting signal voltage to be applied to the signal electrode is changed in polarity within the scanning period, and effective values of positive voltage and negative voltage of the rewriting signal voltage are substantially equal to each other within the scanning period.

8. The liquid crystal display apparatus according to claim 7, wherein the driving device applies the rewriting signal voltage corresponding to each scanning electrode in the selected state to each signal electrode in synchronization with application of the selection signal voltage to the scanning electrode, and an application period of the selection signal voltage to the scanning electrode is ½ the scanning period.

9. The liquid crystal display apparatus according to claim 7, wherein the driving device includes a power circuit which can switch positive and negative of output voltage and a scanning driving IC connected between the power circuit and the plural scanning electrodes, and the power circuit includes a power source having a plurality of output terminals and a circuit for switching the terminals to be connected to the scanning driving IC, and wherein the circuit for switching the terminals reverses the polarity of the driving voltage to be applied to the scanning electrode by changing the terminals to be connected to the scanning driving IC in every frame.

* * * * *